United States Patent
Buck et al.

(10) Patent No.: US 10,880,175 B2
(45) Date of Patent: Dec. 29, 2020

(54) DEVELOPING SECURITY POLICIES FOR DEPLOYMENT TO MOBILE DEVICES

(71) Applicant: Lookout, Inc., San Francisco, CA (US)

(72) Inventors: Brian James Buck, Livermore, CA (US); David Richardson, San Francisco, CA (US); Alex Richard Gladd, Crofton, MD (US)

(73) Assignee: Lookout, Inc., San Francisco, CA (US)

( * ) Notice: Subject to any disclaimer, the term of this patent is extended or adjusted under 35 U.S.C. 154(b) by 0 days.

(21) Appl. No.: 16/296,048

(22) Filed: Mar. 7, 2019

(65) Prior Publication Data
US 2020/0287793 A1    Sep. 10, 2020

(51) Int. Cl.
| G06F 15/173 | (2006.01) |
| G06F 9/455 | (2018.01) |
| H04L 12/24 | (2006.01) |
| G06F 21/57 | (2013.01) |
| H04L 29/06 | (2006.01) |

(52) U.S. Cl.
CPC ........ *H04L 41/0893* (2013.01); *G06F 21/577* (2013.01); *H04L 41/0806* (2013.01); *H04L 41/0886* (2013.01); *H04L 63/20* (2013.01)

(58) Field of Classification Search
CPC ............. H04L 41/0806; H04L 41/0893; H04L 41/0886; H04L 63/12; H04L 63/20; G06F 21/57; G06F 21/577
USPC ........................................................ 709/223
See application file for complete search history.

(56) References Cited

U.S. PATENT DOCUMENTS

| 6,651,191 B1 | 11/2003 | Vacante et al. |
| 8,214,193 B2 | 7/2012 | Chawla et al. |
| 8,495,700 B2 * | 7/2013 | Shahbazi ......... H04W 12/0027 726/1 |
| 8,655,307 B1 | 2/2014 | Walker et al. |
| 8,726,393 B2 * | 5/2014 | Macy ................ G06Q 10/0635 726/25 |
| 9,141,801 B2 | 9/2015 | Moon et al. |
| 9,753,796 B2 | 9/2017 | Mahaffey et al. |
| 9,779,253 B2 | 10/2017 | Mahaffey et al. |
| 10,122,747 B2 | 11/2018 | Mahaffey et al. |
| 10,491,632 B1 * | 11/2019 | Natarajan ............... H04W 4/12 |
| 2015/0024720 A1 | 1/2015 | Efrati et al. |
| 2015/0118992 A1 * | 4/2015 | Wyatt ................. G06F 21/6245 455/410 |
| 2015/0163121 A1 * | 6/2015 | Mahaffey ............ H04L 63/1425 707/687 |
| 2016/0321452 A1 | 11/2016 | Richardson et al. |

(Continued)

*Primary Examiner* — Ruolei Zong
(74) *Attorney, Agent, or Firm* — Greenberg Traurig

(57) ABSTRACT

Techniques for enterprise policy rehearsals, rollouts, and rollbacks are described herein. The techniques can include a server receiving data associated with computing devices. The server compares the received data to data stored in a data repository. The data in the data repository corresponds to risks identified based on information collected from different computing devices prior to receiving the data associated with the computing devices. A risk profile is generated by the server based on comparing the received data to the repository data for each of the computing devices. The server causes, based on the risk profile for each of the computing devices, one or more responsive actions (e.g., using the risk profiles to prioritize deployment of software to the computing devices).

26 Claims, 9 Drawing Sheets

(56) References Cited

U.S. PATENT DOCUMENTS

2018/0018602 A1* 1/2018 DiMaggio .............. G16H 10/60
2018/0262400 A1* 9/2018 Banerjee ............. H04L 41/5009
2018/0359244 A1 12/2018 Cockerill et al.
2018/0367560 A1 12/2018 Mahaffey et al.
2020/0204578 A1* 6/2020 Colquhoun ............. H04L 67/36

* cited by examiner

| CLASSIFICATION | OS | DESCRIPTION | RISK LEVEL | RESPONSE |
|---|---|---|---|---|
| Backdoor | 🤖 🍎 | Opens up protected components to an attacker | High | Alert device |
| Bot | 🤖 🍎 | Enables remote access and control of the device | High | Alert device |
| Exploit | 🤖 🍎 | Leverages OS flaws to gain escalated device privileges | High | Alert device |
| Man-in-the-Middle Attack | 🤖 🍎 | Allows a malicious actor to intercept data sent between two parties | High | Alert device |
| Rogue WiFi | 🤖 🍎 | A wireless access point that imitates a known WiFi to intercept and modify users private data by executing Man-in-the-Middle attacks | High | Alert device |
| Surveillanceware | 🤖 🍎 | Engages in targeted data collection | High | Block internet and |
| Trojan | 🤖 🍎 | Performs malicious activities that are not disclosed | High | Block domains and |
| Worm | 🤖 🍎 | Replicates malicious code from one device to another | High | Alert device |
| App Dropper | 🤖 🍎 | Downloads malicious apps to the device | Medium | Alert device |
| Blacklisted App | 🤖 🍎 | App blacklisted as it violates policies or is unsafe | Medium | Alert device |
| Data Leak | 🤖 🍎 | Leaks PII or other sensitive data off the device | Medium | Alert device |
| Root / Jailbreak | 🤖 🍎 | Device has been rooted or jailbroken | Medium | Alert device |
| Root Enabler | 🤖 🍎 | Enables root access to the device | Medium | Alert device |
| Spam | 🤖 🍎 | Uses device to send spam email or SMS | Medium | Alert device |
| Spyware | 🤖 🍎 | Engages in broad-based data collection | Medium | Block internet and |
| Adware | 🤖 🍎 | Serves intrusive ads or sends excessive PII to ad networks | Low | Alert device |
| Chargeware | 🤖 🍎 | Misleadingly charges the device user | Low | Alert device |
| Click Fraud | 🤖 🍎 | Defrauds ad networks by faking clicks or downloads | Low | Alert device |
| No Passcode | 🤖 🍎 | Device does not have a lock screen or passcode enabled | Low | Alert device |
| Non-App Store Signer | 🍎 | There is a trusted signing identity on the device that may be used to install and execute 3rd party apps not from the iOS App Store | Low | Don't alert device |
| OS Out-Of-Date | 🤖 🍎 | Device has an out-of-date OS version | Low | Block domains and |
| Patch Level Out-Of-Date | 🤖 | Device has an out-of-date Android security patch level | Low | Alert device |
| Riskware | 🤖 🍎 | Engages in risky behavior | Low | Alert device |
| Sideloaded App | 🍎 | Installed from somewhere other than the App Store (supported on iOS 8, 9 and 10) | Low | Don't alert device |
| Toll Fraud | 🤖 🍎 | Fraudulently charges user through premium SMS or carrier fees | Low | Alert device |
| Virus | 🤖 🍎 | A test application used to prove detection efficacy | Low | Alert device |

1. APP THREAT ENCOUNTERS

The following app-based threats were encountered by Lookout-enabled mobile devices that either connected to your organization's network or belong to a Lookout user who connected to your network on another device. Lookout's consumer mobile security application has a 95% self-remediation rate within 24 hours of threat encounters, so while possible, it's unlikely that these app threats were active when a device connected to your network(s). However, these devices represent only a tiny fraction of your total mobile network traffic and should serve as a baseline to understand security risk facing mobile devices on your network that are not currently protected by Lookout.

Lookout broadly classifies app threats using the following risk spectrum:

We recognize that each organization may have unique risk tolerances based on data sensitivities and compliance requirements. Lookout can work with your organization to tailor risk scoring to your specific needs.

Low Risk
Accesses and/or exfiltrates minimal device identifier data.

Medium Risk
Exfiltrates and/or accesses device identifier data and personally identifiable data.

High Risk
Exfiltrates and/or accesses device identifier data and personally identifiable data.
May compromise the integrity of data encryption.
May compromise the integrity of network security measures.

Encounter Rates by Classification

| Risk | Classification | Encounter Rate | Description |
| --- | --- | --- | --- |
| ◆ | Riskware | 32.08% | Engages in risky behavior |
| ◆ | Trojan | 7.16% | Performs malicious activities that are not disclosed |
| ○ | Adware | 44.54% | Serves intrusive ads or sends excessive PII to ad networks |
| ○ | Chargeware | 5.6% | Misleadingly charges the device user |
| ▲ | Root Enabler | 4.98% | Enables root access to the device |
| ◆ | Surveillance | 2.49% | Engages in targeted data collection |
| ◆ | Exploit | 1.24% | Leverages OS flaws to gain escalated device privileges |
| ▲ | Spy | 0.93% | Engages in broad-based data collection |
| ◆ | Bot | 0.62% | Enables remote access and control |

Encounter Rates by Family

| Risk | Family | Prevalence | Risk Profile | Recent Threat | Recent Device Connection |
| --- | --- | --- | --- | --- | --- |

| Risk | Family | Prevalence | Risk Profile | Recent Threat | Recent Device Connection |
|---|---|---|---|---|---|
| ❖ | TowelExploit<br>Exploit | 0.2%<br>2 Devices | This application contains code to bypass a device's security. If the user runs this app, it may cause unwanted behavior. It is also commonly included in apps designed to give the user root permissions which may be desired by the user. | 5/11/2016 | 9/1/2017 |
| ❖ | SMSTracker<br>Surveillance | 0.1%<br>1 Device | This application is a commercial surveillanceware that runs in the background without you knowing. It allows a third party to constantly monitor your device. The third party can view your text and media messages, call logs, and track your locations. If you were not aware of the installation of this application, Lookout recommends you to remove it. | 10/21/2013 | 4/29/2014 |
| ❖ | SMSLocSpy<br>Surveillance | 0.1%<br>1 Device | This application runs silently in the background waiting for a specially configured SMS. When the message is received, the app responds to the sender with the device's GPS location. If you weren't aware that this app was installed on your phone, Lookout recommends you remove it. | 1/14/2012 | 1/30/2015 |
| ❖ | ShadowPlayer<br>Trojan | 0.3%<br>3 Devices | This app pretends to be legitimate but it is malicious. It is capable of aggressively displaying fake law enforcement warnings stating that a user will be prosecuted unless a sum of money is paid. This can lead to a reduced user experience and the inability to access personal data. | 8/19/2017 | 4/12/2017 |
| ❖ | SeedSMSForwarder<br>Surveillance | 0.1%<br>1 Device | This is a commercial surveillanceware that runs secretly in the background, listens to your incoming SMS messages, and forwards them to a preconfigured number. If you were not aware of its installation, Lookout recommends that you remove it. | 6/16/2015 | 3/19/2015 |
| ❖ | RuPaidMarket<br>Trojan | 0.1%<br>1 Device | This application will send premium SMS messages without your knowledge. This may lead to unwanted charges on your phone bill. | 12/7/2012 | 6/12/2015 |
| ❖ | RiskySigner<br>Riskware | 0.2%<br>2 Devices | Lookout has observed malicious or potentially unwanted applications from the author of this app and advises extra scrutiny, as it may exhibit unwanted or risky behavior. | 4/3/2017 | 10/12/2015 |
| ❖ | NotCompatible<br>Trojan | 0.2%<br>2 Devices | This application claims to be a system update on installation. Instead the app will use your phone as a network proxy, allowing remote servers to send and receive traffic through your device. | 3/12/2014 | 8/23/2016 |
| ❖ | MoboRoot<br>Trojan | 0.1%<br>1 Device | This pretends to be a legitimate application, but it is malicious. It will attempt to root the device and allow a third party to install additional apps. This can cause the installation of additional malware. | 5/24/2016 | 6/12/2015 |
| ❖ | Metasploit<br>Trojan | 0.1%<br>1 Device | This application is created from a tool used to generate malicious programs. This app will allow a third party to gain access to the device. | 12/19/2014 | 5/27/2014 |
| ❖ | Maliskus<br>Riskware | 0.1%<br>1 Device | This application has been reported as potentially suspicious to Lookout. We recommend removing it from your device. | 2/12/2015 | 2/13/2015 |

FIG. 9B

DEVELOPING SECURITY POLICIES FOR DEPLOYMENT TO MOBILE DEVICES

FIELD OF THE TECHNOLOGY

At least some embodiments disclosed herein relate to evaluating data associated with operation of computing devices, and more particularly, but not limited to evaluating data to determine expected and/or actual compliance of computing devices with new policies, and/or to determine risks associated with operation of the computing devices.

BACKGROUND

Policy-based management can be used to coordinate device management for an entity to enforce policies. For example, this may be management by a provider for devices of users, or this may be management by an enterprise for devices of users connecting to enterprise networks, servers, or data sources. In one example, policies describe sets of rules (e.g., a rule specifies a set of conditions and an action to take when the conditions are satisfied). The conditions described in a policy may relate to when policy should be enforced based on information embedded in traffic, time conditions, etc.

In one example, a policy is a combination of one or more rules assigned to a mobile device. The mobile device may have a policy assigned to it that includes rules having their own conditions and resulting actions.

In one example, an administrator can develop a set of policies of varying types, determine what enforcement should be performed regarding these policies, and then deploy and/or enforce the policies on devices. The devices are the targets/devices of the policy. In one example, deploying policy includes moving the policy onto a device, translating the policy into target device-specific commands and applying these commands.

Mobile devices are often managed using mobile application management to regulate some aspects of device operation (e.g., operation that is consistent with policies). For example, a user may be an employee of a firm that manages operations on the user's mobile device using mobile application management implemented by a firm server.

Mobile application management (MAM) generally relates to software and services for provisioning and controlling access to internally developed and commercially available mobile apps used in business settings on both company-provided and "bring your own" smartphones and tablet computers.

Enterprise mobile application management is increasingly important due to the widespread adoption and use of mobile applications in business settings. The "bring your own device" (BYOD) phenomenon makes mobile application management more important, with personal PC, smartphone and tablet use in business settings (vs. business-owned devices) significantly increasing. Mobile application management enables corporate IT staff to download required applications, control access to business data, and remove locally-cached business data from the device if it is lost, or when its owner no longer works with the company.

An end-to-end MAM solution can provide the ability to control the provisioning, updating and removal of mobile applications via an enterprise app store, monitor application performance and usage, and remotely wipe data from managed applications.

Mobile device management (MDM) relates to the administration of mobile devices, such as smartphones, tablets, laptops and desktop computers. MDM is usually implemented with the use of a third party product that has management features for particular vendors of mobile devices.

MDM functionality can include over-the-air distribution of applications, data and configuration settings for all types of mobile devices, including mobile phones, smartphones, tablet computers, mobile printers, mobile POS devices, etc. Most recently laptops and desktops have been added to the list of systems supported. MDM tools are used for both company-owned and employee-owned (BYOD) devices across the enterprise or mobile devices owned by consumers. Consumer demand for BYOD is now requiring a greater effort for MDM and increased security for both the devices and the enterprise to which they connect. By controlling and protecting the data and configuration settings for all mobile devices for an organization, MDM can reduce support costs and business risks.

With mobile devices becoming commonplace and increased numbers of applications becoming available for mobile devices, mobile monitoring is growing in importance. Numerous vendors help mobile device manufacturers, content portals and developers test and monitor the delivery of their mobile applications. This testing is done in real-time by simulating the action of thousands of customers and detecting and correcting bugs in the applications.

Typical solutions include a server component, which sends out the management commands to the mobile devices, and a client component, which runs on the mobile device and implements the management commands.

Central remote management uses commands sent over the air to mobile device handsets. An administrator at a mobile operator, an enterprise IT data center or a handset OEM can use an administrative console to update or configure any one handset, group or groups of handsets. The Open Mobile Alliance (OMA) has specified a platform-independent device management protocol called OMA Device Management. It is supported by several mobile devices, such as PDAs and mobile phones.

Over-the-air programming (OTA) capabilities are a component of mobile operator and enterprise-grade mobile device management software. These include the ability to remotely configure a single mobile device, an entire fleet of mobile devices or any IT-defined set of mobile devices; send software and OS updates; remotely lock and wipe a device; and do remote troubleshooting. OTA commands are sent as binary messages, which are messages including binary data.

Mobile device management software enables corporate IT departments to manage the many mobile devices used across the enterprise; consequently, over-the-air capabilities are in high demand. Enterprises using OTA as part of their MDM infrastructure demand high quality in the sending of OTA messages. Present day MDM solutions offer both Software as a Service (SaaS) and on-premises models.

As mentioned above, one example of mobile device management software provides some degree of control and visibility for an administrator of mobile devices. IT managers ensure that mobile devices comply with their organization-specific IT policies and that the correct configuration is pushed to devices. Mobile device management software can permit users to self-enroll over-the-air. In addition to automatically configuring corporate policies and controls, IT can automatically setup WiFi, VPN and Exchange ActiveSync configurations on mobile devices.

An administrator (admin) defines and deploys policies for an organization. The admin may choose from a set of policy controls over password, device encryption, camera, Wi-Fi, VPN, etc. If a device is lost, stolen, retired or replaced, the admin can wipe data from the device to reduce the chance of data loss.

The admin can control and manage various devices from a single console. MDM can support a wide array of mobile devices, operating systems and technologies including Apple iOS, Apple Watch, Android, Windows Pro, Window Phone and Samsung KNOX. Whether Bring Your Own Device (BYOD), Corporate-Owned, Personally-Enabled (COPE) devices or a combination of both are utilized, customizable policies ensure the right policies are applied to the right device.

MDM can support use cases including business users, remote workers, highly-sensitive users, shared devices, and kiosks. MDM can be deployed using a fully cloud-based deployment. MDM can be fully integrated with a Secure Mobility Platform.

SUMMARY OF THE DESCRIPTION

Systems and methods for evaluating data to determine expected and/or actual compliance of computing devices with new policies, and/or to determine risks associated with operation of the computing devices are described herein. Various embodiments are described below.

In one embodiment, a method includes: determining, by a server, a new policy for deployment to a plurality of computing devices; comparing, by the server, the new policy to collected data for the plurality of computing devices, the collected data including information associated with at least one of device configuration, device state, or device behavior for each of the computing devices; determining, by the server and based on comparing the new policy to the collected data, a compliance for each of the plurality of computing devices associated with implementation of the new policy; and based on determining the compliance for each of the plurality of computing devices, causing at least one action.

In one embodiment, a method includes: receiving, by a server, first data associated with first computing devices; comparing, by the server, the first data to second data stored in a data repository, wherein the second data corresponds to risks identified based on information collected from second computing devices prior to receiving the first data; generating, by the server and based on comparing the first data to the second data, a risk profile for each of the first computing devices; and causing, by the server and based on the risk profile for each of the first computing devices, at least one action.

The disclosure includes various devices which perform the above methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 8 shows a display of suggested policy options presented for a user in a user interface based on a pre-deployment risk assessment, where the display presents classifications for various risks, with each risk including a corresponding risk level and a response, according to one embodiment.

FIGS. 9A-9B show a report generated for various computing devices using stored historical risk data and that presents risk profiles for the computing devices, according to one embodiment.

DETAILED DESCRIPTION

Figure 1:
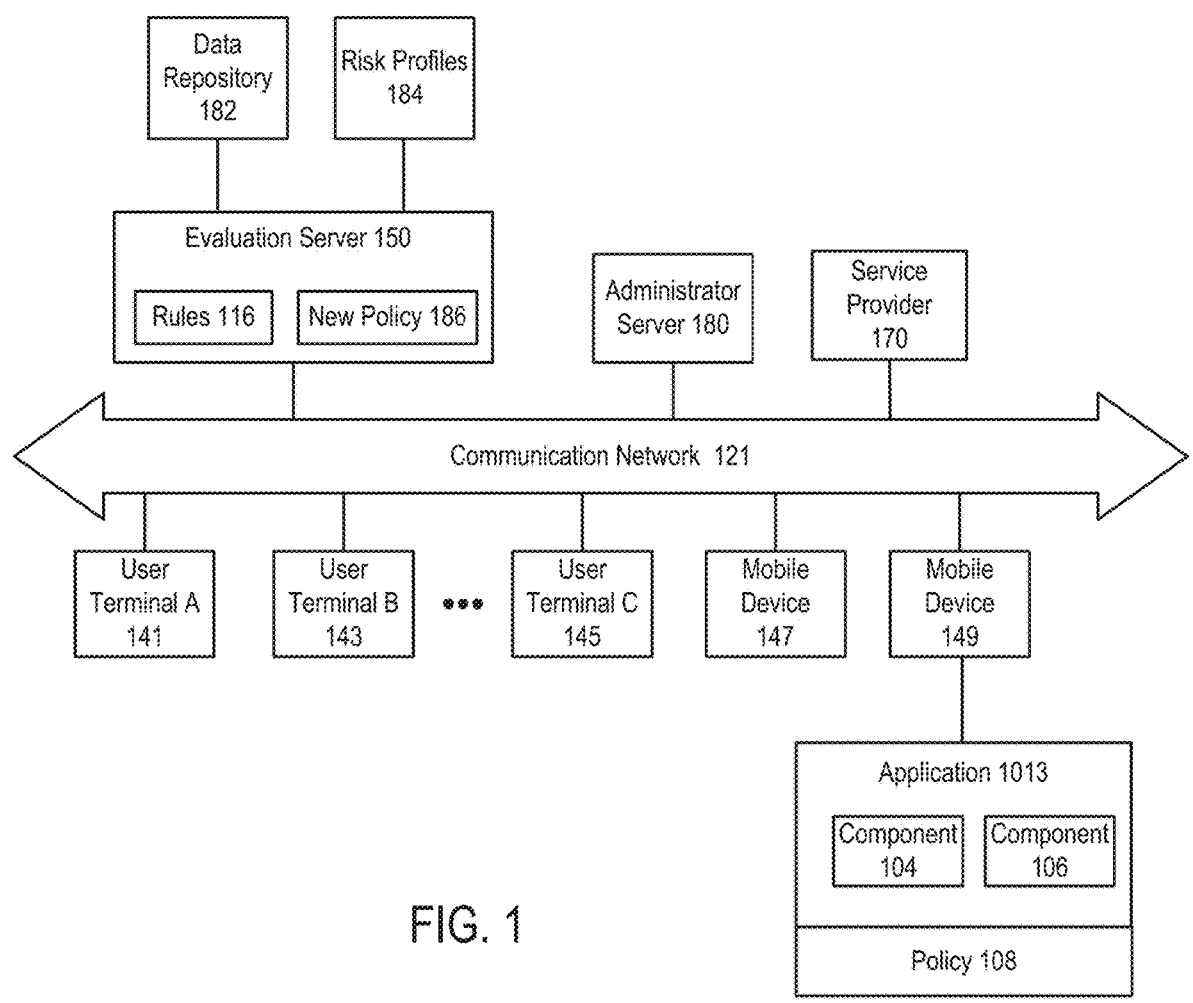
FIG. 1 shows a computing system including an evaluation server to evaluate a new policy to be deployed on various computing devices, according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

At least some embodiments below relate to evaluating data to determine expected and/or actual compliance of computing devices with new policies. At least some other embodiments below relate to evaluating data to determine risks associated with operation of computing devices (e.g., prior to deployment of a new policy to the computing devices). Various non-limiting embodiments regarding evaluating data to determine risks are described in the section below titled "Pre-Deployment Evaluation Server Capabilities Based on Risk Assessment."

Determining compliance for computing devices when deploying a new policy presents several technical problems. In an enterprise, the large scale of the number of devices used by employees and/or other persons associated with the enterprise presents a significant technical problem in managing the devices. In many cases, numerous differences between various types of devices being managed by the enterprise make it difficult to implement policy changes on the devices.

For example, an enterprise administrator that wishes to make a policy change (e.g., deploy a new policy) may not fully appreciate and/or be able to know the impact the policy change will have when deployed/rolled out to thousands or tens of thousands of computing devices.

More specifically, there are several technical problems that are presented by the above situation. First, there is a need for a way to emulate/simulate/rehearse such a rollout to see what will happen, without adversely affecting the devices under management. In many cases, there is a need for a way to stage the rollout to groups of devices over time. Finally, there is a need for a way to rollback the policy change. This rollback may be done either on an administrator request, or automatically. Also, the rollback may be done if certain conditions are not met (e.g., limits on an increase in user or device notifications/alerts/etc. are violated during deployment of a policy change). In at least one embodiment, when it is determined that a rollback is required, an analysis can be performed to determine whether the rollback is required for all mobile devices, or only those mobile devices which are associated with a specific context subset. In an embodiment where it is determined that a rollback is required for mobile devices associated with a specific context subset, the rollback can be targeted to only those mobile devices.

Various embodiments of the present disclosure associated with determining compliance for computing devices when deploying a new policy as discussed below provide one or more technological solutions to the above technical problems. In one embodiment, a trial deployment is initially performed to test the effects of a new policy prior to full active deployment. For example, the trial deployment allows determining whether deployment of a new policy will create an excessive or unacceptable number of violations. In one example, when an administrator deploys a policy, policy violations might generate a large number of alerts on user mobile devices that create significant disruption to user operation of the device and/or activities associated with an enterprise.

In one embodiment, a new policy is deployed in a manner that permits determining an expected compliance of managed devices with the new policy (e.g., the trial deployment is implemented as a "read through" rehearsal). For example, if the expected compliance is determined to exceed a threshold number of violations when the new policy is actually deployed, then the policy can be adjusted.

In one example, a read through rehearsal checks to determine how a policy change (if it were to be actually deployed) is expected to affect compliance of computing devices during their operation after the policy change. A report is generated to determine how many devices would be affected. The report is based on historical data that has been previously collected and stored regarding the computing devices. For example, this historical data may include information associated with device configuration, device state, device behavior, installed applications, etc. In one example, this historical data has been previously collected by mobile device management software that controls policy on the computing devices. A comparison of this historical data is made to the policy change to estimate how many devices would be in or out of compliance with the policy change. In one example, the number of user and/or device notifications/alerts which would be issued is also determined. For example, based on the number of devices in or out of compliance and/or the number of notifications, alerts, or other responsive events, a new policy can be adjusted prior to deployment.

In one embodiment, the new policy is deployed to computing devices in a manner that monitors operation of the computing devices as to compliance with the new policy. However, instead of providing actual alerts to a user of the computing device when a violation occurs, the trial deployment only implements a reporting mechanism in which violations are reported to an administrator without alerting or otherwise disrupting the user (e.g., the trial deployment is implemented as a "dress rehearsal"). In this manner, the administrator is able to obtain actual compliance data from the trial deployment without user disruption. Based on the actual compliance data received, the administrator can adjust the policy.

In one example, a dress rehearsal mode is used to actually roll the policy out to designated devices in parallel. A policy that is in dress rehearsal mode does all the checking that a real active policy would do, but issues no alerts/notifications to the end user, and does not do actual blocking (this type of policy is sometimes referred to herein as a passive policy, in that it is configured to avoid creating alerts and/or other events intended to interact with a user and/or to change operation of a device in a way that a user can perceive). A report is provided from the designated devices back to a rehearsal coordinator (e.g., an administrator server or other server) in the cloud as to what would have happened on the user devices if an active policy were implemented (an active policy corresponds to the passive policy, but an active policy results in actual alerts and other responsive actions being performed on the user device if there is a policy violation). If the rehearsal coordinator is not an administrator server, then the rehearsal coordinator communicates this information to the administrator server. Based on information received back from the designated devices in the dress rehearsal mode, the new policy can be adjusted.

In one embodiment, a staged rollout is used to deploy a new policy (e.g., push out a policy update) to a subset of users and/or computing devices. For example, a staged rollout can be implemented as a dress rehearsal rollout, or as a real active policy rollout.

In one embodiment, a rollout can be broken up into a number of stages (e.g., six stages), so that a new policy is rolled out one stage at a time (e.g., deployed to a certain number of mobile devices in a given stage). Each time a stage is rolled out, error alerts (and/or other responsive actions) are monitored (e.g., monitored by an evaluation server and/or an administrator server), and if a threshold number of alerts (and/or other responsive actions) is reached, then the devices are rolled back to the prior stage. In one example, each stage adds a new number of computing devices for deployment of the new policy. In one example, each stage is for the same number of computing devices, but implements additional portions of a new policy.

In some cases, based on evaluation by an evaluation server of results received from a policy deployment (e.g., deployment of a passive policy in a dress rehearsal, or deployment of an active policy), a rollback of the deployment can be implemented. In one example, a rollback is a reversion of the policy state on each computing device to its prior policy state (e.g., a policy state prior to a dress rehearsal).

In embodiment, an automated rollback can have one or more conditions which are checked on a per-device or a collection-of-devices basis. If the condition(s) are reached or satisfied, then an automated rollback can be implemented for each of the affected devices (e.g., devices for which the conditions are satisfied), or the rollback can be implemented for all devices in the rollout. In some cases, an automated rollback can be implemented for a staged rollout.

In one embodiment, a new policy to be deployed is a policy of a monitoring service or another third-party service (e.g., as implemented by an evaluation server as described herein). In one example, the policy defines which applications installed on user devices are malware, and which are not, and/or defines other known risks. In one example, the monitoring service communicates the new policy to an administrator server, which will actually deploy the new policy.

In one embodiment, a new policy to be deployed is a configurable customer policy. In one example, an administrator is the customer and defines the new policy. For example, an administrator server can define for each computing device a policy to be implemented. In one example, this new policy defines acceptable device and/or software behavior and/or other characteristics of a device. For example, these definitions can include what application behaviors are acceptable, what operating system must be running on the device, what settings should be enabled on the device, etc.

In one embodiment, for configurable customer policies, a capability is provided by an evaluation server to integrate initial trial deployment testing of policies that are defined by a customer (e.g., administrator) in a user interface, and then deployed as described above (e.g., using a read through or dress rehearsal).

In one embodiment, a new policy of a monitoring or other third-party service is integrated with a new policy configured by a customer to provide a combined new policy. The combined new policy is deployed using a trial deployment (e.g., in a dress rehearsal mode) as described above.

In some cases, when deploying a new policy, an administrator may face additional technical problems due to a lack of data regarding risks associated with the computing devices to which the new policy is to be deployed. For example, the administrator does not know which devices may be at higher risk, and thus have a more urgent need for new policy deployment. Further, the existing risks associated with the computing devices may affect the type of new policy that is to be deployed.

Various embodiments of the present disclosure associated with evaluating data to determine risks associated with operation of computing devices as discussed below and provide one or more technological solutions to these additional technical problems above. In one embodiment, an evaluation server receives data associated with certain computing devices on which a new policy is to be deployed. The evaluation server compares the received data to historical data stored in a data repository. The historical data corresponds to risks identified based on information collected from other computing devices (e.g., these other devices are different from the devices onto which the new policy will be deployed, and the other devices may have been observed for an extended time period (e.g., 1-3 years)). For example, this historical data has been collected prior to the deployment by security clients installed on each of the other devices as part of a security management service provided by the evaluation server.

The evaluation server generates, based on comparing the received data for the certain computing devices to the historical data, a risk profile for each of the certain computing devices. The evaluation server uses the risk profiles for each of the computing devices to perform one or more actions. In one example, the risk profiles are used to prioritize a deployment to the certain computing devices in a priority order based on the risk profiles. For example, those computing devices that are at a higher risk can be part of a first rollout stage to receive a deployment of the new policy. Factors to determine a risk profile can include the user's historical behavior (e.g., downloading of unauthorized applications, susceptibility to phishing attacks, etc.), an operating system of the device, applications or other software downloaded on the device, and security features associated with the device.

In one example, prior to deploying a client security application to fleet computing devices, an administrator connects MDM or other software running at an administrator server to risk assessment software running on an evaluation server. In one example, the MDM software is connected to a tenant provided by the risk assessment software. In one example, the tenant is provided using a multi-tenant cloud architecture application that provides a risk assessment service (e.g., using a software as a service model).

The evaluation server requests data about the fleet devices (e.g., installed apps) from the MDM or other software. The evaluation server correlates the received device data against a corpus of mobile risks (e.g., risk data stored in a data repository). Based on the correlation results, the evaluation server performs one or more actions. In one example, a report or user interface display or data is provided including details regarding identified risks associated with the fleet devices. In one example, the report is provided to an administrator server and provides guidance regarding a prioritized deployment to the fleet devices. In one example, the report includes pre-deployment remediation suggestions for action by the MDM software. In one example, the report includes suggested enterprise policy settings (e.g., to be enforced by the MDM software).

FIG. 1 shows a computing system including an evaluation server 150 used to evaluate a new policy 186 to be deployed on various computing devices, according to one embodiment. For example, each computing device can be a user terminal or a mobile device.

In FIG. 1, user terminals (e.g., 141, 143, . . . , 145) and/or mobile devices (e.g., 147, 149) are used to access, communicate, and/or interact with evaluation server 150, an administrator server 180, and/or a service provider 170 over a communication network 121 (e.g., the Internet, a wide area network, a local network, or other wired or wireless communications network). Network 121 may be used to download and remotely install applications selected from an application marketplace (e.g., using Google Play or the Android Market). An application 1013 installed on mobile device 149 may initiate or originate an access request for a service provided by service provider 170.

Mobile device 149 may download new application 1013 from an application marketplace, administrator server 180, service provider 170, or a developer server (not shown). New application 1013 has components 104 and 106. Application 1013 may generate an access request (e.g., for access to a service provided by service provider 170) that is transmitted to a server (e.g., transmitted using a series of computing devices originating with mobile device 149). In one embodiment, the access request is sent by mobile device 149 to evaluation server 150, which forwards a communication regarding the request to service provider 170.

In one embodiment, component 104 is a software component (e.g., a security component, or client application 2207 of FIG. 2 below) that generates or obtains data regarding a risk configuration of a computing device (e.g., a risk configuration of mobile device 149, on which a user initiates a request for access). For example, a user action in a user interface displayed on mobile device 149 causes component 104 to initiate an access request for a service provided by a computing device of service provider 170. The access request is transmitted to evaluation server 150, which can perform a security evaluation of a configuration of mobile device 149 based on various factors (e.g., as part of determining a context of mobile device 149 operation).

Mobile device 149 stores a user policy 108. The new application 1013 may be compared to user policy 108 during or after installation. In one example, evaluation server 150 includes a data repository of policies as rules 116 (e.g., user policies required by an admin server). User policy 108 of mobile device 149 may be compared to policies 116. Administrator server 180 may provide some rules 116 and/or policies in new policy 186 (e.g., as regards usage of or installation of applications onto mobile device 149). In one embodiment, it is determined that user policy 108 is not in compliance with the current state of rules 116 when applied to a currently-determined context of the mobile device 149.

The user policy 108 is stored locally in a memory of mobile device 149. In one embodiment, during operation, user policy 108 may be used to define the handling of components 104 and 106 on mobile device 149. In one embodiment, a user policy for mobile device 149 may alternatively (or in addition to user policy 108) be stored as one of policies 116 on the evaluation server 150 and/or an identity provider (not shown). A user or administrator policy may be enforced on mobile device 149 using either a local user policy or a remote user policy, or a combination thereof.

In one embodiment, an administrator (e.g., administrator server 180) defines and deploys policies for an organization. In some embodiments, the organization may be a family or other social group, and the administrator role may be performed by a parent or guardian, or may be performed by a third party service provider. Such a third party service provider may be a provider of security services, the network operator, and/or a provider of content services. The additional levels of protection and control that organizations such as enterprises desire can also be advantageous for consumers, but consumers are typically not knowledgeable enough to perform administrator roles. Thus, there is often a need for third party service providers to act as technically-oriented admins. The consumer or parent or guardian as an admin may specify preferences corresponding to high-level policy decisions, and a technical admin can configure underlying services to meet these high-level policy decisions. An administrator or admin as used in this disclosure includes, but is not limited to, all such administrators (e.g., technical admin, consumer, parent, guardian, service provider, etc.) as described in this paragraph.

In one embodiment, evaluation server 150 determines new policy 186. For example, the new policy may be defined by an administrator for deployment to mobile devices 147, 149. Evaluation server 150 compares new policy 186 to previously-collected data for mobile devices 147, 149.

The previously collected data is stored in data repository 182. For example, the collected data can include device configuration, device state, and/or device behavior for each of mobile devices 147, 149. Evaluation server 150 determines a compliance for each of mobile device 147 and 149 associated with implementation of new policy 186. This compliance is determined based on comparing new policy 186 to the collected data in data repository 182. For example, this comparison may determine that an operating system on mobile device 149 is inconsistent with a rule of the new policy 186.

Evaluation server 150 uses the determination of compliance for each of mobile device 147, 149 to perform one or more actions. For example, evaluation server 150 can transmit a message to each mobile device that is not compliant with new policy 186, and/or can transmit a message to administrator server 180.

In one embodiment, evaluation server 150 determines a risk profile for each of various computing devices that will be included in a deployment of new policy 186. These risk profiles can be stored as risk profiles 184 on evaluation server 150. Based on the risk profile for each computing device, evaluation server 150 selects a first set of the computing devices for deployment of the new policy 186. The new policy 16 is rolled out to the first set as a first stage of deployment.

In one embodiment, evaluation server 150 receives configuration data associated with mobile devices 147, 149. For example, the configuration data can be previously collected by administrator server 180 when managing and/or enforcing policy on mobile devices 147, 149. Evaluation server 150 compares the configuration data to historical data stored in data repository 182. The historical data includes information regarding risks associated with software components. In one example, the software components are installed on computing devices other than those devices to which new policy 186 will be deployed.

Based on the comparison of the configuration data to the historical data, evaluation server 150 generates a risk profile for each of mobile devices 147, 149. These risk profiles are stored as risk profiles 184.

Based on these generated risk profiles 184, evaluation server 150 causes one or more actions to be performed. For example, the action can be generating a report indicating a prioritized order of deployment of software and/or new policy 186 to mobile devices 147, 149. For example, the action can be performing a remediation action for one of mobile devices 147, 149. For example, the action can be generating an update to new policy 186 prior to deployment to mobile devices 147, 149.

In one embodiment, the generated report is presented to an administrator in a user interface of administrator server 180. The user interface permits the administrator to make changes to the priority order of deployment for a policy. The user interface also permits the administrator to initiate deployment of software in a suggested priority order by providing a user input in the user interface.

In one example, a component is a part of an application (e.g., an application that is installed by a user from an Android or other software application marketplace and then executes on a mobile device). In one example, a component is provided by the application's creator or by a third party. In another example, the component may be code provided by an ad network or an analytics network. In one example, data repository 182 includes historical data regarding structural and/or behavioral characteristics of components observed by evaluation server 150 when monitoring various computing devices (e.g., mobile device 147).

In yet another example, components are linked libraries/SDKs that are packaged within an application. This is code that is within the application, but the code is developed by a third party and provides the ability for an application developer to integrate certain behaviors of that component into the developer's application (e.g., displaying a certain type of ads from a certain ad network such as LeadBolt). In one example, monitoring of context and/or substitution or modification of components based on such monitoring as described herein is integrated as a security component into a developer's or other entity's application. In another example, a set of data (e.g., in a file or a database) that is used by an application may be considered as a component of that application. Also, in some examples, data used by an application can be considered as known or unknown, or trusted or untrusted.

In one embodiment, a user policy (e.g., user policy 108) based on component behavior may be enforced on the user's computing device. User policy 108 may be a result of deployment of new policy 186. In one example, the user policy may require that there be no applications that send location to an advertising network. In another example, the user policy may require that no applications send identifiers to an advertising network.

In one embodiment, it is determined in a pre-deployment assessment or trial deployment that the context of the computing device is or will be in consistent with new policy 186 and/or rules 116. It may also be determined that one or more actions authorized and/or permissions granted by the computing device, such as under the user policy, are inconsistent with the rules 116 associated with the present context of the computing device.

In one embodiment, evaluation server 150 monitors the context in which one or more computing devices is operating. For example, evaluation server 150 determines a context in which user terminal 141 and/or mobile device 149 is operating. This context can be part of the data collected and used in pre-deployment assessment for new policy 186.

After determining the context in which, for example, mobile device 149 is operating, evaluation server 150 determines one or more rules 116 associated with the context. For example, evaluation server 150 determines a geographic location of mobile device 149. This location is used to determine rules 116 that are applicable to operation of mobile device 149 for that determined location. In at least one embodiment, the contexts associated with multiple mobile devices are analyzed to determine subsets of mobile devices having similar contexts.

In another example, evaluation server 150 determines a network to which mobile device 149 is connected or accessing. Based on the determined network, evaluation server 150 determines rules 116 that are applicable to usage of the network. For example, rules 116 that apply to the network may be one or more policies associated with use of the service provided by the network. In one example, the policies are provided by service provider 170. In one example, the policies are provided by an enterprise that manages mobile device 149, which is used by, for example, an employee of the enterprise.

After determining the rules applicable to the present context of the mobile device 149, evaluation server 150 determines whether the computing device is in compliance with the applicable rules. For example, the rules applicable to the present context may include requirements regarding security processing on the mobile device 149. Evaluation server 150 may determine, for example, that encryption and decryption modules on mobile device 149 do not comply with applicable requirements regarding security processing.

In response to determining that the computing device is or will be in violation of one or more applicable rules (e.g., lack of compliance with a new policy to be deployed, or that has already been deployed) above, evaluation server 150 performs one or more actions. In one example, the actions include one or more actions as described above based on determining compliance and/or risk profiles for computing devices on which a new policy is deployed.

In one embodiment, the actions performed by evaluation server 150 include modifying or substitute a component of software on mobile device 149. For example, component 106 on application 1013 can be substituted for a new component. The new component can be sent from evaluation server 150 to mobile device 149, or may already be present on mobile device 149. In one embodiment, the new component can be sent from another computing device, such as service provider 170, or from a developer server.

In one embodiment, the new component to be used for substitution is selected from a set of software components. The new component is selected at least based on its being compliant with the applicable rules to the present context. For example, the new component can be selected based on the geographic location, which corresponds to the applicable rules for the present context.

In one embodiment, the actions performed by evaluation server 150 include sending a communication to mobile device 149 to cause a display of a warning to the user. In one example, the warning indicates that security software on the mobile device 149 is in violation of a policy.

In one embodiment, mobile device 149 can perform actions in response to determining a violation using a table without requiring communication with evaluation server 150. In another embodiment, mobile device 149 communicates with evaluation server 150 after determining the violation.

In one embodiment, if evaluation server 150 authorizes access to a service by mobile device 149, server 150 sends a communication over network 121 to service provider 170 regarding authorizing access to the service. In one embodiment, server 150 determines a risk level for mobile device 149 and includes this risk level in the communication to service provider 170. In one embodiment, determining the risk level is part of determining the context of operation for mobile device 149.

In one embodiment, when component 104 makes a request for access to the service, the request is first sent to service provider 170. Then, service provider 170 forwards the access request to evaluation server 150. Evaluation server 150 performs a security evaluation of risk factors associated with mobile device 149. For example, these risk factors can be used as collected and/or historical data for comparisons above when doing a pre-deployment policy and/or risk assessment. In one embodiment, the risk factors are used to determine the context of the mobile device 149. If the evaluation determines that the configuration is not secure and/or that mobile device 149 is currently operating or will be in violation of one or more rules 116 (or new policy 186), server 150 blocks access by mobile device 149 to the service.

In one embodiment, the security evaluation is based on data received from the mobile device 149. At least a portion of this data can be sent to service provider 170 along with a result of the security evaluation. In one embodiment, this data is received from component 104, or from another software component such as component 106 that is on mobile device 149. The data sent to evaluation server 150 is obtained from the mobile device using this software component.

In one embodiment, the security evaluation by server 150 includes determining a source of application 1013, component 104, and/or component 106. In one embodiment, the security evaluation includes evaluating authenticity of software on mobile device 149 and/or analyzing at least one component installed or otherwise stored on mobile device 149.

In one embodiment, the security evaluation determines an extent of security risk for mobile device 149 based on a plurality of factors. The extent of access to the service provided to mobile device 149 is based on this extent of security risk.

In one embodiment, the security evaluation determines that a risk configuration of mobile device 149 passes a security threshold. If the threshold is passed, server 150 sends a communication to service provider 170 regarding the passed security threshold. This communication may include data obtained from mobile device 149 and used in the security evaluation above.

In one embodiment, if it is determined by evaluation server 150 in a security evaluation or as part of a context determination, performed after a user has started receiving a service, that a risk level associated with mobile device 149 exceeds a threshold or is otherwise un-trusted, then an open session of the user with the service from service provider 170 can be closed. Also, any token of mobile device 149 indicating a healthy or safe configuration of the device can be revoked or destroyed. This prevents further access to the service by the device. In one embodiment, if access to a service is terminated as just described, an identity provider can be notified of the change by evaluation server 150. Also, a level of access to the service can be decreased based on the newly-determined risk level, instead of terminating all access to the service. In one embodiment, this risk level is used as part of determining a priority order for deployment of new policy 186.

In one embodiment, if it is determined by evaluation server 150 that mobile device 149 is not configured correctly or adequately for a present context as determined by a risk level, various actions may be taken. For example, mobile device 149 may be instructed to take a photo that is uploaded to server 150, acquire a device location and upload to server 150, and/or erase sensitive data on mobile device 149. Other examples include disabling login credentials, instructing the user how to remediate the problem, allowing login by the user, but denying access to certain services, revoking a token already in use by the device, and/or changing a password for the service.

In one embodiment, data used in a context determination or security evaluation by evaluation server 150 is extracted from one or more communications received from mobile device 149, and/or from service provider 170. In some cases, such communication can be the communication that includes the access request. In other cases, the communication is received prior to or subsequent to receiving the access request.

In one embodiment, the access request is generated by application 1013, which is executing on mobile device 149. Performing the security evaluation includes determining the authenticity of application 1013, for example as discussed below.

In one embodiment, the security evaluation can include assessing a context of a user of mobile device 149. This context can be determined by various factors including a location of mobile device 149, a device location for at least one prior login made by the user (e.g., a prior login to the service), an event associated with the presence of the user on a computing device other than mobile device 149 (e.g., this other device may be a tablet, a laptop, or a watch device of the user), or credentials associated with the user that have become unsecure (e.g., credentials that have been identified from monitoring of the dark web).

In one embodiment, mobile device 149 is associated with a domain. Evaluation server 150 performs an evaluation using data from one or more prior communications received by evaluation server 150. These prior communications may be provided from other computing devices associated with the domain.

In one embodiment, access to the service from service provider 170 requires that a software component is installed on mobile device 149. In response to determining that the software component is not installed, the communication is sent to the mobile device requesting installation of the software component. After sending this communication, evaluation server 150 determines whether the software component is properly installed on mobile device 149. If so, server 150 sends a communication to cause service provider 170 or an identity provider to authorize or grant access to the service.

In various embodiments, access to a service provided by service provider 170 is conditioned on a successful evaluation of various risk-based factors. Mechanisms that may be used to authenticate a device, user, and/or application by evaluation server 150 include one or more of the following: requiring that an SSL client certificate be supplied for each access request by mobile device 149, evaluating authentication factors provided from network connection establishment (e.g., Wi-Fi, VPN, cellular, etc.) by mobile device 149, or evaluating authentication factors provided from establishment of a network tunnel or proxy connection for mobile device 149.

In various embodiments, factors used in a context determination or a security evaluation by evaluation server 150 for a pre-deployment assessment, for collected or historical data for comparisons to a new policy, and/or to allow or deny access to a service are now described below:

1. Various device factors associated with mobile device 149 include determining whether the device is compromised, such as whether an operating system is compromised, whether the device is up-to-date, such as whether a vulnerable operating system version is in use. Further factors include determining a presence of malware, or determining whether the device has a secure configuration. For example, determining whether a bad SSL root identified for certificate authorities is installed on the device, an anomalous VPN/proxy is identified, whether device encryption enabled, and/or whether a pin code is enabled. Further factors include evaluating hardware-backed authentication associated with mobile device 149. For example, determining whether a device key is stored in a secure enclave, or whether a server provides a nonce which mobile device 149 signs with hardware to prove presence of hardware-stored key.

2. Various user factors may be used in the security evaluation. These factors may include biometric factors such as a fingerprint, or knowledge-based factors such as whether a user of mobile device 149 is able to answer knowledge-based questions (e.g., about the user's background or prior life or work activities).

3. Various application factors may be used in the security evaluation. These factors may include determining whether application 1013 on mobile device 149 is an authorized or allowed version of the application. For example, whether the application is the official enterprise application or an unofficial version. Also, these factors include determining whether the application is up-to-date, such as whether there is a known vulnerability in this particular application.

4. Various context factors may be used in the security evaluation. These factors may include determining a location of device 149, other recent user logins and respective devices/locations associated with these logins, and/or other user-present events (e.g., a badge in, CCTV facial recognition, Wi-Fi connections, and Bluetooth beacon detections).

In one embodiment, evaluation server 150 collects data from the device and sends the data to a cloud back-end server system accessible to server 150 in order to compare the collected data to other data that evaluation server 150 has collected. Types of data collected include, for example, an application inventory of all apps installed on the device, version numbers for the apps, and what are the hashes and unique identifiers associated with those applications. In one example, this collected data is stored in data repository 182. Evaluation server 150 fingerprints the filesystem of the device (e.g., firmware, etc.) and calculates a fingerprint for the device so evaluation server 150 can determine when a device is running modified firmware or other (improperly) modified software.

In one embodiment, evaluation server 150 collects information regarding how the network is behaving (e.g., the network communication path between evaluation server 150 and mobile device 149, or communications by mobile device 149 with other computing devices). For example, evaluation server 150 runs a series of behavioral tests on each network to which mobile device 149 connects (e.g., whether the device is sending potentially hack-able communications to random or unknown servers; whether there been any attempt to downgrade the TLS or other secure version of protocol being used for communication; and/or whether the certificates that the device is receiving from these requests are valid, etc.). In at least one embodiment, evaluation server 150 can run behavioral tests based on context subgroups. The result of the behavioral test can be used to determine whether the rollout will be performed to the mobile devices associated with the context subgroup. For example, if a deployment of software is of high priority or important (e.g., due to a discovered or analyzed risk), but one or more context subgroups are determined to fail a behavioral test(s), the software can be deployed to the mobile devices that are associated with those context subgroups which pass the behavioral test(s).

In one embodiment, at least a portion of data associated with the security evaluation by evaluation server 150 is sent to service provider 170. The service provider can configure a policy regarding the type of data that is sent by evaluation server 150 (e.g., using a console provided to the service provider by evaluation server 150). Use of this policy can group the device based on the evaluated data into a risk class (e.g., high-risk or low-risk). Evaluation server 150 only communicates to service provider 170 the class of risk based on the previously-determined or configured policy (e.g., using the console) of the service provider.

In one embodiment, all of the functions above are provided, but instead of using a separate client application on the device, the attestation functionality is provided via an SDK that controls the active application in the device directly. In other words, a software component is a part of the active application on the device that makes the request for access to the service.

In one embodiment, one or more SDK components are present in an application. Evaluation server 150 determines that the application is in violation of rules 116 based on the context determination. In response, evaluation server 150 causes modification or substitution of the one or more SDK components on mobile device 149.

In one embodiment, the analysis functions performed by the evaluation server 150 can be done via an SDK that is injected into a client application that the user is currently using on the user's device. One example is an identity provider (e.g., Okta has an app that facilitates single sign-on using a user device). The Okta app can include an SDK that incorporates the security evaluation functionality above so that the app can make risk decisions itself instead of having to consult another application or computing device.

In one embodiment, a use case is a business-to-consumer use case. For example, a bank can decide that before customers are permitted to login to a banking application, or attempt to initiate a large balance transfer, the evaluation server checks the risk level of the device. The bank can require that the user install an application that incorporates or uses the security evaluation discussed above.

In one embodiment, there are cases where the evaluation server determines that a device should not be trusted without first requiring installation of a client application on the device. For example, based on headers received by the evaluation server, it is determined that the device is running an older operating system that is deemed as being unacceptably old. So, a security evaluation does not necessarily require consulting a client application on the user device. There are cases where the evaluation server can make a decision not to trust the device (e.g., solely from a SAML request) even though no client application is on the device. In other cases, the untrusted device can be included in a higher priority new policy rollout.

In one embodiment, the service request to service.com is made by an application on mobile device 149 that is associated with service.com. This application is configured to communicate with evaluation server 150 when an access request is made to the service.com domain. Evaluation server 150 is configured to communicate with the identity provider if server 150 determines that the device is in a secure state. If server 150 determines that the device is insecure, server 150 can request that the user remediate any issue identified.

In one embodiment, evaluation server 150 checks that a device is free of threats and is compliant with a corporate policy corresponding to service provider 170. Regarding vulnerabilities and this policy, these can be configured by service provider 170 based on the service provider's desired risk threshold. For example, for the risk of an operating system version that is too old, the service provider sets the policy as to whether the service provider wants to prevent access to that device. In other cases, regarding behavior and configuration, a determination can be made whether the application running on the device is compliant with policy, whether the way that the device is configured is compliant with policy, whether there is a passcode set, etc.

Figure 2:
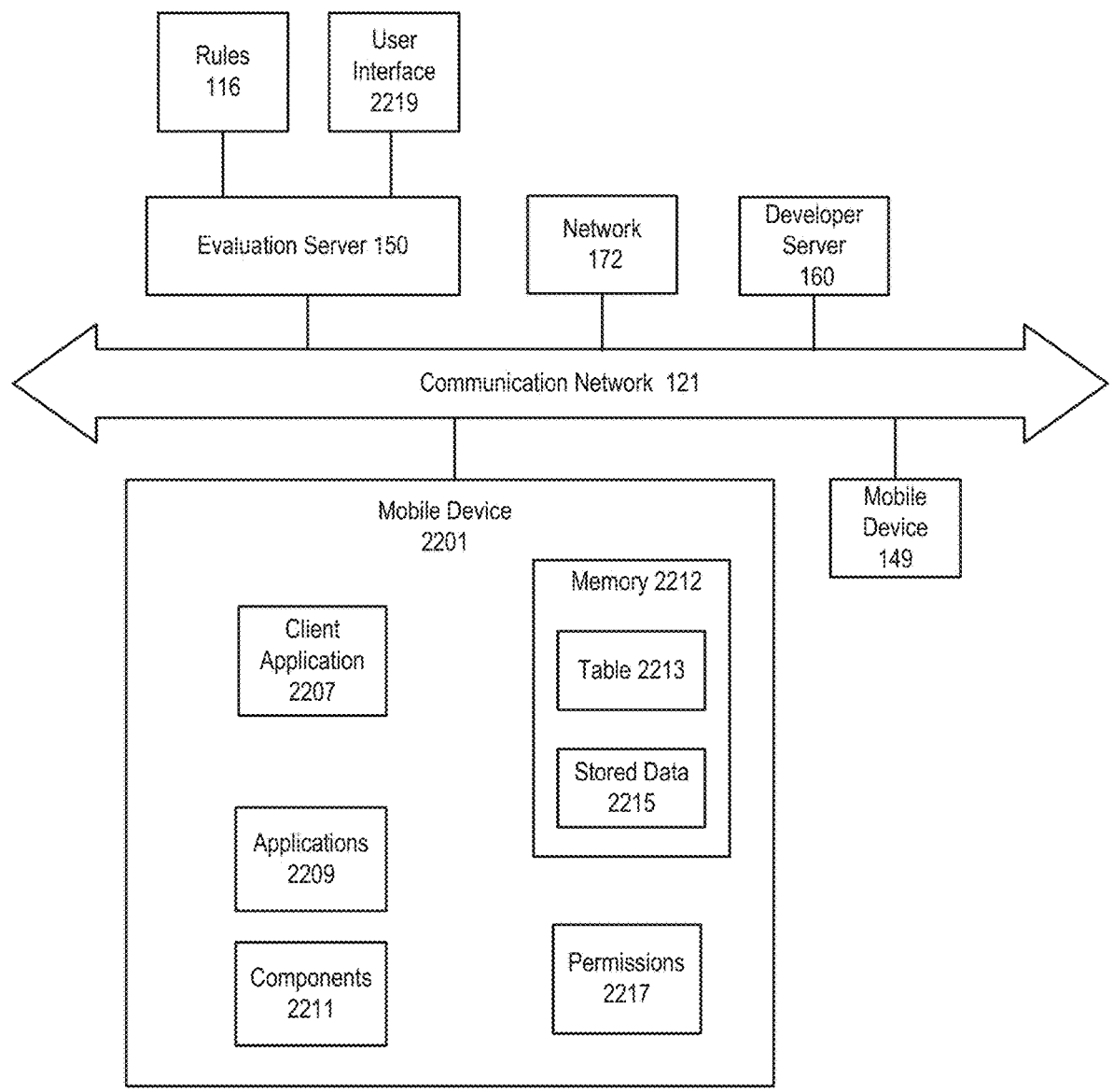
FIG. 2 shows a computing system for generating risk profiles for computing devices based on comparing new device data to previously-collected device data, according to one embodiment.

FIG. 2 shows a computing system for generating risk profiles (e.g., risk profiles 184) for various computing devices based on comparing new device data to previously-collected device data, according to one embodiment. For example, evaluation server 150 generates a risk profile for mobile device 2201, similarly as discussed above for mobile device 149.

In one embodiment, mobile device 2201 accesses network 172 over communication network 121. For example, mobile device 2201 accesses a service provided via network 172. In one embodiment, an application on mobile device 2201 is obtained from developer server 160. In one example, the application includes an SDK component related to security, which is modified or substituted in response to determining a violation associated with deployment of a new policy to mobile device 2201.

Mobile device 2201 includes memory 2212 that stores a table 2213 and/or stored data 2215. Table 2213 includes a list of geographic locations and corresponding rules associated with each location.

Mobile device 2201 includes security software 2207. For example, security software 2207 communicates with evaluation server 150. Security software 2207 collects data from one or more sensors of mobile device 2201 as part of determining a context. One or more of the sensors can be related to determining a geographic location of mobile device 2201.

Security software 2207 also may determine one or more permissions 2217 that have been configured on mobile device 2201, such as by the user. Security software 2207 reports one or more of these permissions 2217 to evaluation server 150.

Mobile device 2201 includes applications 2209 and components 2211. Applications 2209 are an example of application 1013. Components 2211 are an example of components 104 or 106. Components 2211 can be stored on mobile device 2201 for use in future modification or substitution into or with one or more applications 2209. For example, a component 2211 can be used to substitute a component of an application 2209 in response to determining that mobile device 2201 is in violation of new policy 186, a rule 116 and/or a rule in table 2213.

In some embodiments, the manner of usage and/or behavior of an application on a computing device can be monitored and this can be part of a context determination for the computing device (e.g., which is part of the collected data used for new policy comparison above). The usage or behavior of components of the application on the device that are inconsistent with a user or administrator-designated policy can be identified. In such event, the source of the application and/or use of the application can be deemed as untrusted or in violation of a rule 116.

There are various examples of policies that may be used on mobile or other computing devices. For example, a user policy may define the handling of components 104 and 106 on mobile device 149. A policy may be defined by behavioral preferences established by a user and/or an administrator, and this policy is enforced on new applications installed on the mobile device. In another example, a policy may apply to a particular identified application.

In other examples, policies may be defined and applied to control or restrict the behavior of applications and their components. This can include the identification of advertising networks and defining policies to permit various opt-out actions for these advertising networks.

Although FIG. 2 illustrates an exemplary system implemented in client-server architecture, embodiments of the disclosure can be implemented in various alternative architectures. For example, the evaluation server 150 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

In one embodiment, an enterprise risk level is determined, for sharing security risk information between enterprises by identifying a security response by a first enterprise and then sharing the security response to a second enterprise when a relationship database profile for the first collection indicates the security response may be shared. Methods are also provided for determining whether to allow a request from an originating device where the request may have been initiated by a remote device. In one embodiment, the security risk information is used in the security evaluation performed (e.g., by the evaluation server 150 of FIG. 1 above or by another computing device) in response to the access request above. In one embodiment, data obtained from a mobile communications device is evaluated by the evaluation server 150 of FIG. 1 above to determine if granting the device access to a service presents a security threat.

In one embodiment, aggregated information is used in the security evaluation above. In one embodiment, a method is provided for passing aggregated information, such as source information, along with an access request. In the embodiment, aggregated information may be used to determine whether to allow an attempt to access a resource. The aggregated information may include, for example, user authentication information and source information, and source information may include, for example, information about the state of the initiating and originating computing devices, attributes or identifies of applications being used in the access attempt, and similar information from any intermediate ("intervening" or "chained") application or computing device that is part of the access attempt.

The aggregated information may be passed with the access request in a number of ways, including, for example: as SAML security assertion extensions, as additional HTTP headers, or via a separate flow. In a further example, a single sign-on (SSO) provider (or Identity Services Provider) may piggyback the aggregated information onto an access request (or responses), and security components on computing devices in the access request chain may add their contributions to the aggregated information in the SSO information flow.

In one embodiment, responses to an access request other than or in addition to "allow" and "deny" are allowed. For example, if the access request related to running an application on the destination computing device and the associated source information indicted that a computing device in the series was untrusted, a security component may allow the request in a limited fashion (e.g., run with output quarantined), or deny the request and initiate or suggest to the user the uninstallation of the target application.

In one embodiment, a secure platform enables mobile devices, such as a cell phones, smartphones, or PDAs, to have relationships with services or service providers that are controlled by the state of security on each device. In one example, the platform is comprised of a server that receives data from security software on a mobile device regarding the device's security state. The platform enables access to a service to be granted, denied, or limited based on the security state of the mobile device. The platform may provide two-way communications between a mobile device and a service so that the platform can enforce access security both from the client to the service and from the service to the client. Furthermore, the platform allows services or service providers to evaluate the security state of a device independently of using the platform to communicate with the device.

In one embodiment, a system provides, by a software component on a computing device (e.g., for components on any one or more devices in a series of devices transmitting an access request, as discussed above), a dynamic assessment of a security state of a computing device (e.g., this assessment may be performed by the evaluation server 150 of FIG. 1 above). Here, the user of a mobile communications device may request access to a service provider. This may be where the user attempts to access a banking service or other network based service using software installed on a handset. This request may be managed by a server, which receives the request from the computing device. The server may access a database or other memory to determine whether it has updated security state information for the device. If not, then, this security state information is obtained from the device. Once obtained, the security state for the device may be assessed. If the security state is acceptable, then the device may have access to the service provider. If the device security state is unacceptable, then access may be limited or denied. The acceptability of a device's security state and the level of access to the mobile communications device may be set, for example, by the service provider. In various embodiments, the access control may be used to control access to the service provided by service provider 170 of FIG. 1 above.

In one embodiment, a system and method is for reporting security information relating to a mobile device. In one embodiment, the security evaluation performed above (e.g., by the evaluation server 150 of FIG. 1 above) is a security assessment. This security assessment is displayed in various formats on the mobile device display or on a client computer. A security component identifies security events on the mobile device that are processed on the mobile device or by a server. The security component then determines a security assessment for the mobile device based upon the detected security events. The security assessment display may be persistent in the form of a desktop widget or dashboard on a client computer, or home-screen item on the mobile device. This allows a user or administrator to verify that security protection on the device is functioning and to be alerted if the device needs attention without having to specifically seek the information, thereby enabling immediate response to potential security problems.

In one embodiment, a method is for evaluating security. This method evaluates security during an interactive service operation by a mobile communications device and includes launching, by a mobile communications device, an interactive service configured to access a server over a network during an interactive service operation, and generating a security evaluation based on a plurality of trust factors related to a current state of the mobile communications device, to a security feature of the application, and/or to a security feature of the network. When the security evaluation is generated, an action is performed based on the security evaluation. In one embodiment, the evaluation server 150 above performs an evaluation, including use of a threshold. In one embodiment, these plurality of trust factors are included in the first data above received by the evaluation server 150 for use in the evaluation.

Figure 3:
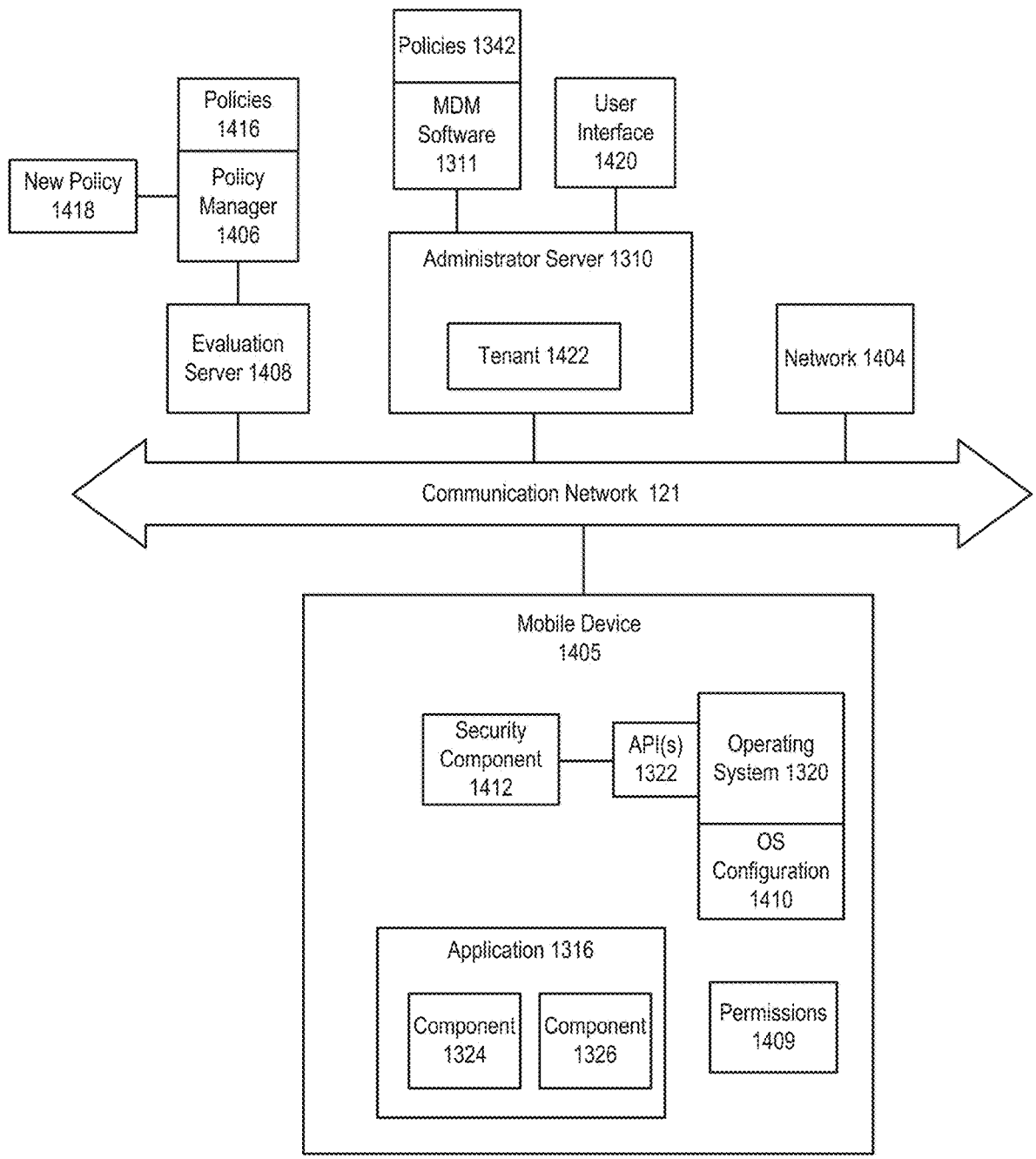
FIG. 3 shows a computing system for evaluating a new policy to be deployed by an administrator server to various mobile devices, according to one embodiment.

FIG. 3 shows a computing system for evaluating a new policy 1418 to be deployed by an administrator server 1310 to various mobile devices, according to one embodiment. These mobile devices include mobile device 1405. In one embodiment, evaluation server 1408 monitors mobile device 1405 for expected or actual compliance with new policy 1418 and/or policies 1416. Evaluation server 1408 is an example of evaluation server 150. For example, policy manager 1406 is software on evaluation server 1408 used to monitor and/or evaluate the expected or actual compliance.

In one embodiment, administrator server 1310 is connected to evaluation server 1408 via a tenant 1422. In one example, tenant 1422 is connected to MDM software 1311 so that configuration, context, and/or other data associated with mobile device 1405 that has been collected by MDM software 1311 can be transmitted to evaluation server 1408 for use in pre-deployment comparisons to new policy 1418, such as described above.

In one embodiment, user interface 1420 of administrator server 1310 permits an administrator to control deployment of new policy 1418 to mobile device 1405. In one embodiment, user interface 1420 presents reports and/or other information provided from evaluations performed by evaluation server 1408. In one example, the report shows expected compliance with a deployment of new policy 1418. In one example, a priority order of deployment of new policy 1418 is presented in user interface 1420.

In one embodiment, evaluation server 1408 also optionally can manage permissions associated with one or more computing devices, according to one embodiment. Evaluation server 1408 executes policy manager 1406 to manage permissions associated with various computing devices including mobile device 1405. Evaluation server 1408 stores new policy 1418 and policies 1416 in memory (not shown). Policies 1416 are implemented by policy manager 1406 on mobile device 1405.

In one embodiment, policies 1416 correspond to an enterprise policy. Permissions 1409 for various software on mobile device 1405 are maintained by policy manager 1406 to be in compliance with policies 1416. In one example, admin server 1310 transmits data regarding policies 1342 to evaluation server 1408, which data is used to update policies 1416 as regards acceptable permissions for mobile device 1405. In one embodiment, mobile device management software 1311 is executed by admin server 1310 and is used to manage mobile device 1405 along with other computing devices.

In one embodiment, evaluation server 1408 determines a change of context for mobile device 1405. For example, evaluation server 1408 may determine that mobile device 1405 is attempting to connect to network 1404. In another example, evaluation server 1408 may determine that mobile device 1405 is attempting to install software from an application marketplace.

In response to determining the change of context and/or in response to a pre-deployment assessment of new policy 1418, evaluation server 1408 determines whether mobile device 1405 is or will be in violation of new policy 1418 and/or one or more policies 1416 associated with a new or expected context of mobile device 1405. In response, evaluation server 1408 can revoke one or more permissions for software on mobile device 1405 based on the change of context or lack of policy compliance. Security component 1412 resides on mobile device 1405 and can be used to revoke or deny permissions on mobile device 1405. In one embodiment, security component 1412 also can implement changes to a configuration 1410 of operating system 1320. In one embodiment, security component 1412 uses one or more application programming interfaces (APIs) 1322 in order to make modifications to operating system 1320. In one embodiment, these APIs permit security component 1412 to, in response to determining that mobile device 1405 is in violation of one or more rules, modify or substitute component 1324 or 1326 of application 1316.

Figure 4:
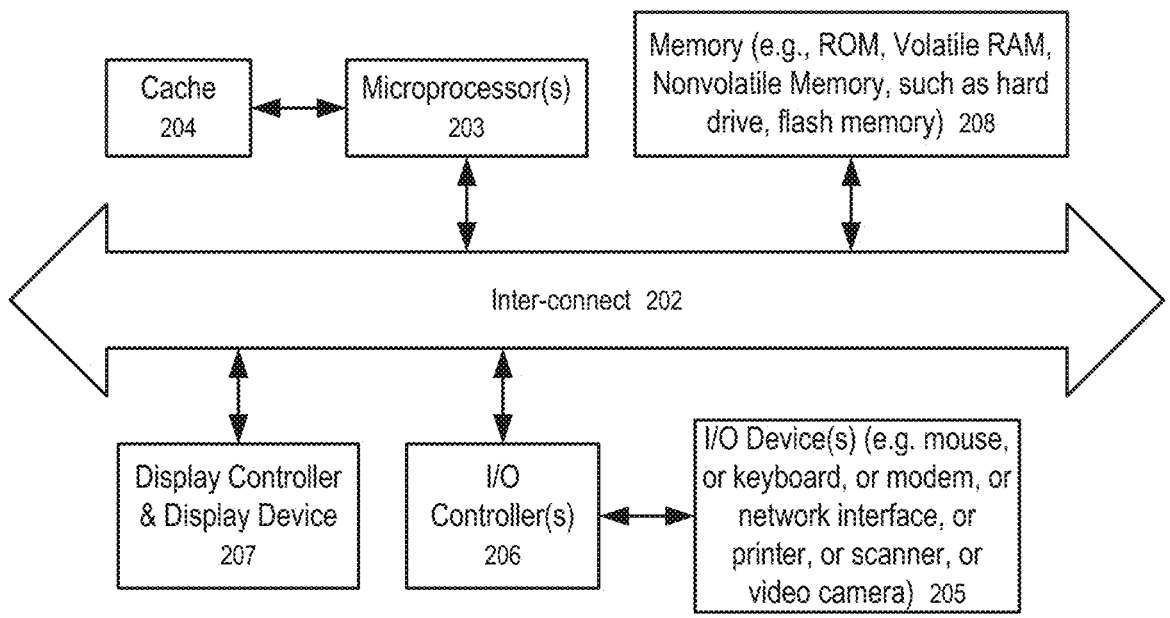
FIG. 4 shows a block diagram of a computing device (e.g., an evaluation server, or an administrator server) which can be used in various embodiments.

FIG. 4 shows a block diagram of a computing device (e.g., an evaluation server 150, or an administrator server 1310) which can be used in various embodiments. While FIG. 4 illustrates various components, it is not intended to represent any particular architecture or manner of interconnecting the components. Other systems that have fewer or more components may also be used. In an embodiment, an evaluation server, an administrator server, an authenticity server, or an identity provider may each reside on separate computing systems, or one or more may run on the same computing device, in various combinations.

In FIG. 4, computing device 201 includes an inter-connect 202 (e.g., bus and system core logic), which interconnects a microprocessor(s) 203 and memory 208. The microprocessor 203 is coupled to cache memory 204 in the example of FIG. 4.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 4 is used to implement evaluation server 150, an application marketplace, service provider 170, administrator server 1310, and/or other servers.

In another embodiment, a computing device as illustrated in FIG. 4 is used to implement a user terminal or a mobile device on which an application is installed or being installed. A user terminal may be in the form, for example, of a notebook computer or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 5:
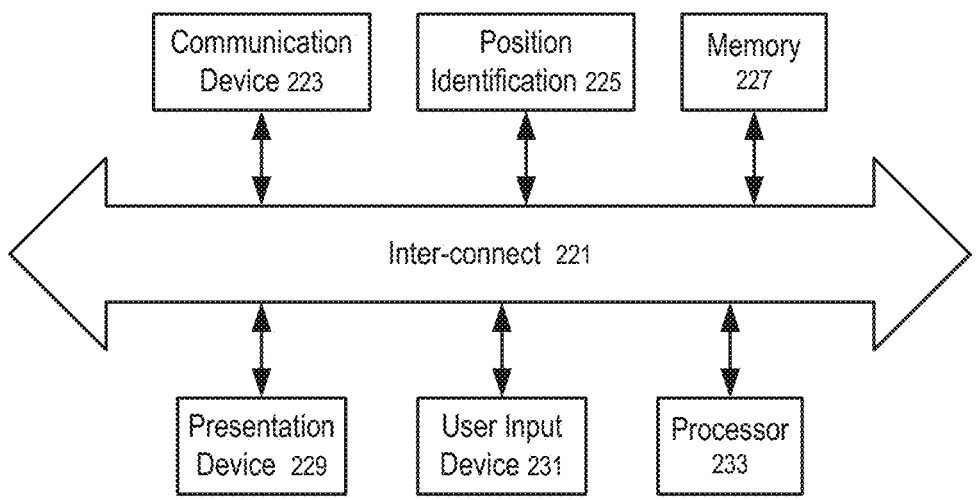
FIG. 5 shows a block diagram of a computing device (e.g., a mobile device of a user, or a user terminal), according to one embodiment.

FIG. 5 shows a block diagram of a computing device (e.g., a mobile device of a user, or a user terminal), according to one embodiment. In FIG. 5, the computing device includes an inter-connect 221 connecting the presentation device 229, user input device 231, a processor 233, a memory 227, a position identification unit 225 and a communication device 223.

In FIG. 5, the position identification unit 225 is used to identify a geographic location. The position identification unit 225 may include a satellite positioning system receiver, such as a Global Positioning System (GPS) receiver, to automatically identify the current position of the computing device.

In FIG. 5, the communication device 223 is configured to communicate with a server to provide data, including application data (e.g., an application identifier and a source identifier for a newly-sourced application). In one embodiment, the user input device 231 is configured to receive or generate user data or content. The user input device 231 may include a text input device, a still image camera, a video camera, and/or a sound recorder, etc.

Figure 6:
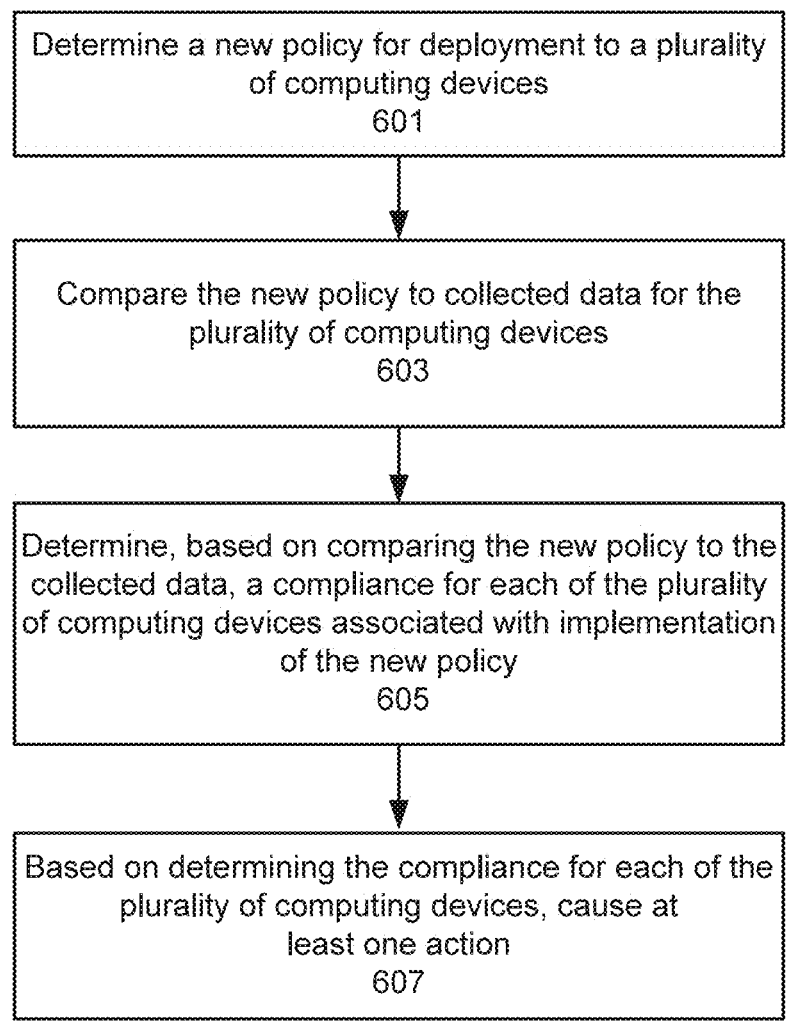
FIG. 6 shows a method for determining expected and/or actual compliance for computing devices associated with deployment of a new policy, according to one embodiment.

FIG. 6 shows a method for determining expected and/or actual compliance for computing devices associated with deployment of a new policy, according to one embodiment. For example, the method of FIG. 6 can be implemented in the system of FIG. 1, 2, or 3.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 6 is performed at least in part by one or more processors of evaluation server 150 of FIGS. 1 and 2, or server 1408 of FIG. 3. In one embodiment, evaluation server 1408 is implemented using the processors and memory of FIG. 4 or 5.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, a new policy is determined for deployment to a plurality of computing devices. For example, evaluation server 150 determines that new policy 186 will be deployed to mobile devices 147, 149.

At block 603, the new policy is compared to collected data for the plurality of computing devices. For example, evaluation server 150 compares data collected from mobile devices 147, 149 to one or more rules in new policy 186.

At block 605, based on comparing a new policy to the collected data, a compliance is determined for each of the computing devices. This compliance is associated with implementation of the new policy. For example, it may be determined that a given device will not be compliant when the new policy is deployed on that device. For example, evaluation server 150 determines that mobile device 149 will not be compliant when new policy 186 is deployed. This determination is based on the comparison of the new policy 186 to the collected data.

At block 607, one or more actions are performed based on determining the compliance for each of the plurality of computing devices. For example, the one or more actions can be performed by evaluation server 150. In one example, the one or more actions can be performed by administrator server 180 in response to receiving a communication from evaluation server 150. In one example, a report is provided to administrator server 180 that indicates a risk profile for each of mobile devices 147, 149.

In one embodiment, a read through rehearsal is used to automatically generate statistical results regarding expected compliance. These results are compared against a database of collected data regarding devices to which a new policy will be deployed. The comparison generates expected results from actual deployment. For example, an expected result can be an expected number of responses, such as alerts, from an actual deployment. In one embodiment, during a dress rehearsal, if the number of responses exceeds the expected number of responses from the read through rehearsal, then a deployment can be rolled back to a prior stage.

In one embodiment, the collected data above is collected from a set of devices according to a data collection policy. The data can be, for example, associated with device configuration, device state, and/or device behavior. A historical norm or baseline is established using the collected data. In one embodiment, the historical norm or baseline can be compared to expectations or actual results from deployment of a new policy. If there is a lack of compliance determined based on a deviation outside of a threshold deviation between the norm or baseline and the new policy, a message is transmitted to an administrator server and/or other action is performed.

In one embodiment, a method comprises: determining, by a server (e.g., evaluation server 150 or evaluation server 1408), a new policy (e.g., new policy 186) for deployment to a plurality of computing devices (e.g., mobile device 149, mobile device 2201, mobile device 1405); comparing, by the server, the new policy to collected data for the plurality of computing devices, the collected data including information associated with at least one of device configuration, device state, or device behavior for each of the computing devices; determining, by the server and based on comparing the new policy to the collected data, a compliance for each of the plurality of computing devices associated with implementation of the new policy; and based on determining the compliance for each of the plurality of computing devices, causing at least one action (e.g., transmitting a message to administrator server 180 including a report of risk profiles).

In one embodiment, determining the compliance of each of the plurality of computing devices is performed prior to deployment of the new policy to the computing devices (e.g., as part of a read through rehearsal).

In one embodiment, the method further comprises deploying the new policy to the plurality of computing devices, wherein determining the compliance of each of the plurality of computing devices is performed after deploying the new policy.

In one embodiment, the at least one action comprises at least one of transmitting a message to at least one of the plurality of computing devices, or transmitting a message to an administrator server that manages policy for the plurality of computing devices.

In one embodiment, the at least one action comprises generating a report comprising information for each of the plurality of computing devices indicating whether the computing device complies with the new policy.

In one embodiment, the method further comprises: determining a risk profile for each of the plurality of computing devices (e.g., the determined risk profiles are stored as risk profiles 184); selecting, based on the risk profile for each computing device, first devices of the plurality of computing devices for deployment of the new policy; and deploying the new policy to the first devices.

In one embodiment, the at least one action is at least one first action, and wherein the new policy is a passive policy that includes at least one second action to be performed on a computing device in the event of a policy violation, the method further comprising: deploying the passive policy to the plurality of computing devices (e.g., as part of a dress rehearsal deployment), wherein determining the compliance for each of the plurality of computing devices comprises monitoring compliance of the computing device with the passive policy during operation after deploying the passive policy, and wherein the at least one second action is not implemented on any computing device operating under the passive policy; receiving a report from the plurality of computing devices, the report comprising an indication of those computing devices that exhibit the policy violation; and based on the report, deploying an active policy to the plurality of computing devices, wherein the active policy corresponds to the passive policy, and wherein the at least one second action is performed on the computing devices that exhibit the policy violation.

In one embodiment, determining the compliance for each of the plurality of computing devices is performed prior to deployment of the new policy to the computing devices, and provides an expected compliance from the deployment of the new policy, the method further comprising: deploying the new policy to the plurality of computing devices in stages, each stage corresponding to deployment of the new policy to a portion of the plurality of computing devices; after deploying the new policy to each stage, comparing an actual compliance with the new policy to the expected compliance; and based on comparing the actual compliance to the expected compliance for a first stage of the stages, rolling back deployment from the first stage to a prior stage.

In one embodiment, based on a determination that operation of an application will violate at least one rule of a new policy, mobile device 1405 provides a warning notification by display in a user interface. In one embodiment, this warning notification is provided in response to an attempt by user to launch an application, or shortly after launching the application. In one embodiment, a notification is provided to the user indicating an alternative application that can be downloaded by the user, or that is already present on mobile device 1405.

Behavioral and/or structural characteristics of a component present in a new application may be identified. This may be, for example, an application 1013 that has been installed on mobile device 149. These characteristics may be inputs to a context determination above.

In one embodiment, there are various ways to identify characteristics that are actually present in a component of an application. Information can be gathered from an application on a mobile device for further processing at a server. According to this embodiment, information that has been gathered is then used for component analysis at the identity provider (discussed above) in order to identify characteristics of a component.

In another embodiment, behavioral characteristics may be determined or collected using other approaches. For example, behavior may be determined based on network traffic (e.g., SMS, IP) data, or based on the code source of a given behavior (e.g., a class name or a package name responsible for geo-locating, or a fingerprint of a code segment responsible for sending SMS traffic).

In various other embodiments, the results from component identification for applications on a device are presented to the user. The user may provide input in a user interface to define or update a user policy based on this component identification. For example, the user may opt-out of an identified component.

Also, in particular, U.S. Patent Publication No. 2011/0047594 describes a system for providing advisement about applications on mobile devices such as smartphones, netbooks, and tablets. A server gathers data about mobile applications, analyzes the applications, and produces an assessment that may advise users on a variety of factors, including security, privacy, battery impact, performance impact, and network usage. The disclosure helps users understand the impact of applications to improve the experience in using their mobile device. The disclosure also enables a server to feed information about applications to other protection systems such as application policy systems and network infrastructure. The disclosure also enables advisement about applications to be presented in a variety of forms, such as through a mobile application, as part of a web application, or integrated into other services via an API. The data gathered by the server may be used, for example, as one or more inputs in the plurality of inputs for evaluating the first application as described herein. Also, some of the forms of advisement discussed may be used, for example, in providing notifications to the user and/or to developers or others regarding evaluations of software authenticity.

In one embodiment, security evaluation and scoring uses a plurality of trust factors. In one example, some of the trust factors may be used as inputs when evaluating application authenticity.

Figure 7:
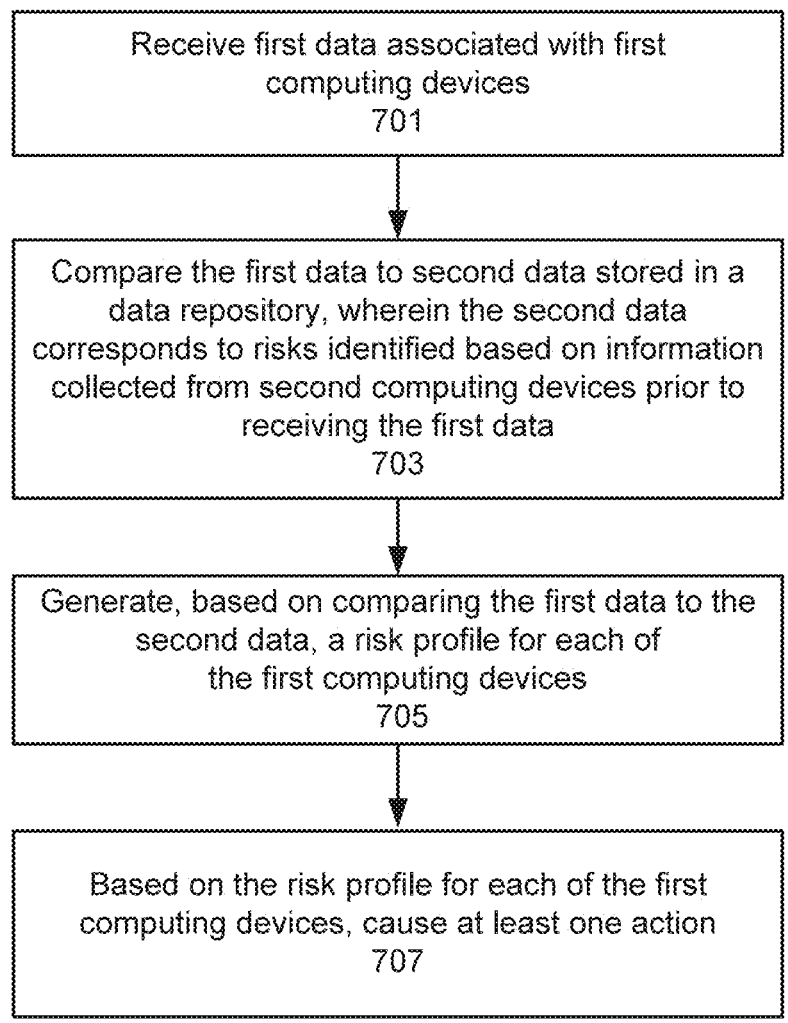
FIG. 7 shows a method for generating a risk profile for computing devices based on comparing device data, according to one embodiment.

FIG. 7 shows a method for generating a risk profile for computing devices based on comparing device data, according to one embodiment. For example, the method of FIG. 7 can be implemented in the system of FIG. 1, 2, or 3.

The method of FIG. 7 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 7 is performed at least in part by one or more processors of evaluation server 150 of FIGS. 1 and 2, or server 1408 of FIG. 3. In one embodiment, evaluation server 1408 is implemented using the processors and memory of FIG. 4 or 5.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 701, first data associated with first computing devices is received. For example, evaluation server 150 receives data associated with mobile devices 147, 149. The data is received by evaluation server 150 from administrator server 180.

At block 703, the first data is compared to second data stored in a data repository. For example, the second data is historical risk data stored in data repository 182. For example, the second data corresponds to risks identified based on information collected from second computing devices prior to receiving the first data. For example, the second data is historical data that has been collected from managing security for computing devices other than those devices associated with a proposed or actual new deployment.

At block 705, a risk profile is generated for each of the first computing devices. The risk profile is based on comparing the first data to the second data. For example, evaluation server 150 generates risk profiles 184 based on comparing the first data to historical data stored in data repository 182. In one example, the historical data includes identified risks associated with particular software components.

At block 707, one or more actions are caused based on the risk profile for each of the first computing devices. For example, evaluation server 150 transmits a report to administrator server 180 that causes a display of information in a user interface 1420 of administrator server 1310.

In one embodiment, a risk response is configured using MDM software 1311 (e.g., the risk response is based on the risk profiles generated at block 705). In one example, a trigger is added to drive a compliance response for one or more policies. When a policy is applied to a device (because the device becomes associated with a corresponding risk label), a compliance action will be executed (as the device will be out of compliance based on the trigger). This allows MDM software 1311 to drive an appropriate response based on the security risk posture of the device (e.g., a risk posture as provided by a report of device risks from evaluation server 150 to administrator server 180).

In one embodiment, a method comprises: receiving, by a server (e.g., evaluation server 150 or evaluation server 1408), first data associated with first computing devices (e.g., mobile devices 147, 149); comparing, by the server, the first data to second data stored in a data repository (e.g., data repository 182), wherein the second data corresponds to risks identified based on information collected from second computing devices prior to receiving the first data; generating, by the server and based on comparing the first data to the second data, a risk profile (e.g., risk profiles 184) for each of the first computing devices; and causing, by the server and based on the risk profile for each of the first computing devices, at least one action.

In one embodiment, the at least one action comprises at least one of generating a report regarding prioritized deployment of software to the first computing devices, performing a remediation action for at least one of the first computing devices, or generating a new policy for deployment to the first computing devices (e.g., new policy 186 is updated based on an initial trial deployment).

In one embodiment, the at least one action comprises generating a report regarding prioritized deployment of software to the first computing devices; the software is a client application (e.g., security component 1412, application 1316, or application 1013) for installation on the first computing devices; and the client application is deployed to each computing device in a priority order based on the risk profile for the respective computing device.

In one embodiment, the method further comprises receiving the first data from an administrator server (e.g., administer server 1310), wherein the administrator server manages policy on the first computing devices, and has collected the first data from the first computing devices.

In one embodiment, causing the at least one action comprises causing the administrator server to deploy software to each of the first computing devices in a priority order based on the risk profile for the respective computing device.

In one embodiment, the method further comprises: causing presentation, in a user interface (e.g., user interface 1420 or user interface 2219), of a priority order for deployment of software to the first computing devices, wherein the priority order is based on the risk profile for each computing device; and wherein deployment of the software in the priority order can be initiated by a user input in the user interface.

In one embodiment, the method further comprises: tracking deployment of the software to the first computing devices; after deployment of the software to the first computing devices, performing a risk assessment for each of the first computing devices; comparing the risk profile to the risk assessment for each of the first computing devices to provide a comparison result for each computing device; and causing presentation, in the user interface, of the comparison result for each computing device.

In one embodiment, the method further comprises causing a label to be added, by an administrator server, to a computing device needing remediation based on the risk profile for the computing device, wherein adding the label causes a remediation action to be performed by the administrator server for the labeled computing device.

In one embodiment, the server is a first server (e.g., evaluation server 1408), an administrator server (e.g., administrator server 1310) manages policy on the first computing devices, and the at least one action comprises generating a new policy for deployment to the first computing devices, the method further comprising: receiving the first data from the administrator server; and sending, by the first server, a communication causing the administrator server to implement the new policy on the first computing devices.

In one embodiment, a system comprises: at least one processor; and memory storing instructions configured to instruct the at least one processor to: receive first data associated with first computing devices; compare the first data to second data stored in a data repository, wherein the second data corresponds to risks identified based on information collected from second computing devices prior to receiving the first data; generate, based on comparing the first data to the second data, a risk profile for each of the first computing devices; and cause, based on the risk profile for each of the first computing devices, at least one action.

In one embodiment, the at least one action comprises generating policy options for deployment of a new policy to the first computing devices, and wherein the instructions are further configured to instruct the at least one processor to: cause presentation, in a user interface, of the policy options, wherein each policy option includes risk levels and corresponding actions to be performed on the first computing devices in response to a violation of the new policy; wherein the new policy to be deployed is determined based on a user selection from the policy options.

In one embodiment, the instructions are further configured to instruct the at least one processor to: compare a new policy to the first data, wherein the new policy is for deployment to the first computing devices, and wherein the first data includes information associated with at least one of device configuration, device state, or device behavior for each of the first computing devices; determine, based on comparing the new policy to the first data, a compliance for each of the first computing devices; and report the compliance for each of the first computing devices to an administrator server that manages policy for the first computing devices.

FIG. 8 shows a display of suggested policy options presented for a user in a user interface based on a pre-deployment risk assessment, where the display presents classifications for various risks, with each risk including a corresponding risk level and a response, according to one embodiment. For example, this display may be presented on user interface 2219 or user interface 1420 (e.g., after performing a read through rehearsal or a dress rehearsal). The user is able to customize the policy selections prior to initiating a deployment of a new policy.

In one embodiment, an administrator may not know what its mobile risk profile is until client security software (e.g., client application 2207, or security component 1412) is deployed to its fleet computing devices, and actual risk detection results are observed (e.g., based on data provided to evaluation server 150 from security monitoring of the device using security component 1412). However, based on the pre-deployment risk assessment (e.g., produced from device data from MDM software 1311 (or data from a third-party service)), guidance on policy settings can be suggested while the administrator is still in the pre-deployment state. As part of a mobile risk assessment, there can be a call-to-action for a "Suggested Policy". In one example, the policy suggestions present a selection of policy options along with the risk level and response settings that are suggested based on the pre-deployment risk assessment (e.g., as sent in a report to administrator server 1310). In one example, each suggestion includes provenance describing why the suggestion is made.

In one example, a policy suggestions can include setting a particular policy item response to "don't alert". This can be based on a prediction that the policy item may trigger a large percentage of the administrator's managed devices to disrupt user operation.

In one example, a root/jailbreak and root enabler item is set to low risk and don't alert. This can be due to a large percentage of enterprise devices being observed to have these types of apps installed. Thus, this suggests this situation is normal for the enterprise.

FIGS. 9A-9B show a report generated for various computing devices using stored historical risk data and that presents risk profiles for the computing devices, according to one embodiment. For example, the report can be generated by evaluation server 150 or evaluation server 1408 based on evaluating device data and/or assessing a potential deployment of a new policy. For example, the report can be sent by evaluation server 150 to administrator server 180. In one example, the report includes potential threats, potential application risk, potential data leaks, geographic risks, and/or device vulnerabilities.

In one embodiment, a risk profile can be presented for identified devices, and/or groups of devices. The risk profile can be presented with a corresponding level of risk (e.g., low, medium, or high). In one example, a risk profile can include a risk score based on a context of a computing device.

Pre-Deployment Evaluation Server Capabilities Based on Risk Assessment

Various non-limiting embodiments are now described below that relate to evaluating data to determine risks associated with operation of computing devices (e.g., prior to deployment of a client application to the computing devices that is used to manage security risks on the computing devices). In one embodiment, referring again to FIG. 3, security component 1412 is a client application installed a mobile device 1405 that is used to manage security.

For example, security component 1412 collects data from mobile device 1405 that is used to assess a context of operation for mobile device 1405. For example, security component 1412 collects data from mobile device 1405 that is transmitted to evaluation server 1408 and used to identify risk(s) associated with mobile device 1405. In one example, the data transmitted relates to characteristics of components 1324, 1326 on mobile device 1405.

In one example, mobile device 1405 is part of a fleet of devices managed by administrator server 1310. Administrator server 1310 communicates with evaluation server 1408 to learn of and/or receive data regarding new risk(s) that may be identified by evaluation server 1408 for mobile device 1405 and/or other fleet devices. In one example, the risk is identified by evaluation server 1408 by comparing data received from security component 1412 with historical risk of data in a data repository (e.g., data repository 182).

In one example, a deployment of security component 1412 to fleet devices of an enterprise includes communicating with mobile device 1405 to have a user install security component 1412 on mobile device 1405. In one example, the status of deployment to each device is tracked by administrator server 1310 and/or evaluation server 1408. For example, security component 1412 can report to evaluation server 1408 that it is in an active state. Evaluation server 1408 maintains a tally of states for security components on each fleet device in a deployment. In one example, this deployment can be a dress rehearsal as discussed above. In one embodiment, evaluation server 1408 performs polling of MDM software 1311 to track a deployment status of security component 1412 for each device. In one example, the deployment states can include pending, active, disconnected, and deactivated.

In one embodiment, when a mobile risk assessment is performed by evaluation server 1408 (e.g., prior to deployment of security component 1412), data is collected about devices and apps from MDM software 1311 (and/or is collected from a computing device of a similar or other third-party service). In one example, the collected data can include, but is not limited to the following:
  Device and device user identifier(s)
  Device make, model, and network type
  Device firmware version, build code, and patch level
  Application metadata: package/bundle identifiers, signer data, name/title, version code/name
  Correlations between devices and apps (i.e., which apps are installed on which devices)

With this data collected, a manifest is created of all distinct devices in the data and their correlated apps. This manifest is correlated with an existing corpus of historical data about mobile devices and applications. In one example, this historical data is stored in data repository 182 as discussed above for FIG. 1. In one example, the historical data includes, but is not limited to the following:
  Device and firmware geographic prevalence
  Firmware vulnerabilities
  Application geographic prevalence
  Application vulnerabilities
  Application capabilities
  Application malware, riskware, and/or adware
  Correlations to mobile threats (e.g., signers, network activity, etc.)

In one embodiment, the correlation of the manifest with the existing corpus of historical data generates a risk profile for each device listed in the input manifest (including mobile device 1405). In one embodiment, the manifest alternatively and/or additionally can be provided as an input into a machine learning/artificial intelligence model that outputs a risk score for each device listed in the input manifest. In one example, the risk profile is based on a mobile risk model that has been trained using the existing corpus of historical data above. In one embodiment, the generated risk profile and/or risk score for each device are used to rank each device in the manifest in a priority order of overall potential risk (e.g., a priority order in decreasing risk).

In one embodiment, after generating a risk profile by evaluation server 1408 for each of various computing devices managed by administrator server 1310, data is presented to a user in user interface 1420. In one example, the data is based on the risk profile generated for each device. In one example, the data is a priority order of potential risk (e.g., as indicated by a risk score) associated with each device.

In one embodiment, as part of the mobile risk assessment, user interface 1420 presents a call-to-action for a "Suggested Deployment Priority". A similar call-to-action can be displayed on other deployment-related web or interface pages once the mobile risk assessment has been performed. Interaction with these calls-to-action can direct users to a separate user interface for displaying deployment priority recommendations.

In one embodiment, the user interface contains a list of devices and/or users (depending on what data can be pulled from MDM software and/or a third-party service) in the order in which it is suggested that the administrator/customer should deploy a security component or other application/software. The list may be partitioned into risk levels (e.g., low, medium, high) based on the devices' prioritization assessment results. For each item in the list, a provenance can optionally be displayed that was used to make the prioritization assessment (e.g., data from the device's risk profile and risk score).

In one embodiment, the user interface may contain interactions which allow a user of services provided by evaluation server 1408 to select devices/users from the prioritized list and initiate deployment through MDM software 1311 (or via another third-party service used for fleet devices). Once the security component has been deployed to those devices/users, the respective devices/users are removed from the prioritized list, and the list continues to display the remaining undeployed devices/users in a priority order.

In one embodiment, a user interface can be used that, for devices that have been deployed, compares a pre-deployment risk profile of the device (e.g., generated by evaluation server 1408 using a corpus of historical data) to its actual assessed risk post-deployment (e.g., a risk assessment performed based on data collected by security component 1412 after installation (e.g., data regarding components 1324, 1326), and after such data is sent to and evaluated by evaluation server 1408). In one example, this interface can serve as a validation of a pre-deployment risk assessment, and/or provide a confirmation to an administrator that the appropriate devices have been prioritized for deployment.

In one embodiment, the prioritized deployment is initiated using administrator server 1310. This deployment is based on data provided from evaluation server 1408 as a result of generating a risk profile for each of several computing devices, including mobile device 1405.

In one embodiment, the prioritized deployment is implemented by a workflow as follows:

1. Pre-deployment, an administrator connects MDM software 1311 (or a similar third-party service) to a tenant (e.g., tenant 1422) associated with evaluation server 1408 and initiates a mobile risk assessment. Evaluation server 1408 performs a deployment prioritization assessment as part of the mobile risk assessment.

2. Once the mobile risk assessment is complete, the administrator interacts with the prioritized deployment call-to-action which is prominently displayed (e.g., in user interface 1420).

3. The prioritized deployment user interface presents the administrator with a suggested deployment prioritization, for example including provenance, and provides tools to initiate deployment for select groups of devices.

4. Using this prioritization guidance, the administrator formulates a deployment rollout plan and uses tools on the presented prioritization page to initiate prioritized deployment.

5. As deployment rollout progresses, the same user interface can be used to keep track of which devices in the prioritized list have been selected for deployment and their state (pending, deployed, disconnected, etc.).

6. As devices in the prioritized list are successfully deployed and become active, they are removed from the prioritized list.

7. Devices that were once part of the pre-deployment prioritization plan that are now deployed and active can be presented in a separate part of the user interface that compares a pre-deployment risk prediction to the actual post-deployment risk assessment (e.g., risk assessment performed by evaluation server 1408 based on data collected from mobile device 1405 using security component 1412 and/or another installed client application).

8. As new, undeployed devices are added to MDM software 1311 (or similar third-party service), tenant 1422 can be used to automatically collect data for the new devices, perform the risk and prioritization assessments, and update the deployment prioritization list as necessary (e.g., for an updated presentation in user interface 1420).

9. The tenant 1422 can periodically update its risk and prioritization assessment for undeployed devices based on updated data from MDM software 1311 (or similar third-party service). As a result, the prioritized deployment list can be updated as necessary.

10. Administrator server 1310 can be notified if the prioritized deployment list changes based on new data (e.g., new device and/or app data) so that the administrator can take action as necessary based on the new priorities.

In one embodiment, a deployment prioritization assessment is performed by using an algorithm that takes device data, user data (if available), and the generated device risk profiles above as inputs. Based on these inputs, the algorithm deterministically ranks the devices in order of potential risk, where the potential risk is determined by comparing the data about each device to every other device in the input data.

In one embodiment, user interface 1420 is used by an administrator to initiate prioritized deployment. In one example, the user selects which devices to initiate deployment to from a prioritization page. In one example, the user clicks a button on the page to initiate deployment for selected devices. In one example, based on a tenant configuration (e.g., for tenant 1422), evaluation server 1408 uses MDM software 1311 to deploy security component 1412 to the selected devices, and/or sends an enrollment email or other message to those devices.

In one embodiment, information is presented in user interface 1420 that shows an accuracy for the risk predictions made for devices pre-deployment (e.g. predicted vs. actual results). After deployment, actual data has been collected from mobile device 1405 and other devices. This actual data is used to prepare an updated risk assessment for comparison to the pre-deployment risk profile. In one example, in the pre-deployment risk assessment, a particular device is prioritized for deployment based on certain potential risks. Once the administrator deploys security component 1412 to that device, evaluation server 1408 can verify whether or not the device actually exhibits those risks. The user interface presentation can be provided to administrator or other user that shows these comparison results (e.g., mobile device 1405 was prioritized based on risks identified in a pre-deployment evaluation, and after deployment, actual data collected by security component 1412 was used to identify these same predicted risks).

In one embodiment, data is collected by evaluation server 1408 using periodic polling of MDM software 1311. For example, data can be collected every hour or every day. This data is used to update a risk profile for mobile device 1405. In one embodiment, this data includes data provided by security component 1412. In one embodiment, this data includes data received from and/or observed for application 1316. In one embodiment, this data includes a configuration of permissions 1409. In one embodiment, the state includes an operating system configuration 1410.

In one embodiment, automatic deployment can be initiated for a new device if the risk assessment exceeds a predetermined threshold. For example, evaluation server 1408 can send a message to MDM software 1311 identifying a new device for which automatic deployment should be initiated.

In one embodiment, based on correlation results of device data from MDM software 1311 against a corpus of historical risk, such as discussed above, evaluation server 1408 performs actions indicating suggested remediation actions to be performed pre-deployment (e.g., prior to deployment of security component 1412 or client application 2207). In one example, the suggested remediation actions are sent to administrator server 1310. In one example, the suggested remediation actions are presented in user interface 1420. In one example, the suggested remediation actions are implemented automatically by MDM software 1311.

In one embodiment, when in a pre-deployment state, evaluation server 1408 is not yet able to initiate remediation actions based on actual assessed device risk (e.g., because security component 1412 has not yet been installed on the mobile device 1405 or other new devices). However, based on the pre-deployment risk profile generated for each device, such as discussed above, immediate remediation strategies can be suggested or otherwise indicated (e.g., to administrator server 1310 and/or another computing device) (e.g., indicated by a communication sent by evaluation server 1408). For example, as part of a mobile risk assessment presented by evaluation server 1408, there can be a prominent call-to-action for "Suggested Remediation". The remediation suggestions may be in the form of guidance for manual implementation via the MDM software 1311 and/or, to an extent possible, automatic implementation via APIs of the MDM software 1311 (or similar third-party service). For example, evaluation server 1408 can implement one or more of these remediation suggestions automatically using an API of MDM software 1311. Immediate remediation suggestions may vary based on a particular fleet of devices, the particular administrator, the particular enterprise, and/or the nature of employees using mobile devices that are managed by administrator server 1310. Optionally, each remediation suggestion can include provenance information describing why the suggestion is being made.

Various examples of suggestions can include, but are not limited to, the following:

- Non-compliance based on device make/model (e.g., device make and/or model is an outlier based on the enterprise's geographic norm).
- Non-compliance based on firmware version (e.g., firmware version is an outlier based on the enterprise's geographic norm, firmware identifiers don't match known-good firmwares, and/or firmware has vulnerabilities with in-the-wild exploits).
- Non-compliance based on installed app(s) (e.g., apps are outliers based on the enterprise's geographic norm, apps have capabilities (or combinations of capabilities) that are particularly risky for enterprises, apps are suspected (e.g., with high confidence) to be malicious, and/or apps have vulnerabilities with in-the-wild exploits).

In one embodiment, in some cases, an administrator may not use MDM software to manage its fleet devices. Instead of data from MDM software (or additionally to such data), the same, similar, and/or other data is received by evaluation server 1408 from an operating system provider (e.g., Apple, Google and/or the mobile network operators (MNOs) with their specific Android versions). In one case, deployment can be direct (e.g., email/SMS), or can be done through the operating system provider.

In some cases, in addition to and/or alternatively to data collected from MDM software, evaluation server 1408 can receive data from various other sources. These can include, for example, an identity provider (IdP), AD (e.g., Microsoft Active Directory), Workday, firewall, computing device or network service (e.g., that has information about device lists, app presence, etc.), Samsung Knox, Android for Work; MAM technology (e.g., a container, etc., information, or remediation action, etc.). In one example, for immediate remediation capability, evaluation server 1408 can query network middlebox server app connections, blackhole an application, and/or ask an identity provider to prevent access to certain network or corporate resources.

In various examples, the types of collected data can differ. For example, data may include data received from a firewall (e.g., a next-generation firewall (NGFW)) or an identity provider (e.g., Okta). In one example, the data can include data about a user (e.g., job title/role, such as pulled from Microsoft Active Directory or human resources systems), network traffic (e.g., as a type of data), firewall rules, and/or network access control (NAC)/other as an immediate remediation action (e.g., CISCO Security Connector) (e.g., like a forensics box for everything with respect to a device).

In one embodiment, collected data includes DNS level info. In one example, data is collected using the Apple iOS NEDNSProxyProvider (where NE stands for Network Extension, and DNS stands for the Domain Name System). NEDNSProxyProvider is an API that lets, for example, evaluation server 1408 see all DNS traffic from the mobile device 1405 or other devices having an installed security component, and to perform various actions as a result.

In one embodiment, data collected from the MDM software 1311 (e.g., including device identifiers) is used to determine if any of the devices have an existing client application that is already communicating with, and/or has previously communicated with, evaluation server 1408 regarding security or otherwise for the respective device. If so, data from the existing client application is used as part of evaluating mobile device 1405 or other new devices and generating a risk profile for each device.

CLOSING

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible or non-transitory machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   determining, by a server, a new policy for deployment to a plurality of computing devices in stages;
   determining an expected compliance from deployment of the new policy;
   deploying the new policy to first computing devices in a first stage;
   comparing, by the server, the new policy to collected data for the first computing devices, the collected data including information associated with at least one of device configuration, device state, or device behavior for each of the first computing devices;
   determining, by the server and based on comparing the new policy to the collected data, a respective actual compliance for each of the first computing devices associated with implementation of the new policy;
   comparing, for each of the first computing devices, the respective actual compliance to the expected compliance; and
   based on comparing the respective actual compliance to the expected compliance, rolling back deployment for at least one of the first computing devices from the first stage to a prior stage.

2. The method of claim 1, wherein determining the expected compliance is performed prior to deployment of the new policy to the first computing devices.

3. The method of claim 1, further comprising at least one of transmitting a message to at least one of the first computing devices, or transmitting a message to an administrator server that manages policy for the first computing devices.

4. The method of claim 1, further comprising generating a report comprising information for each of the first computing devices indicating whether the respective first computing device complies with the new policy.

5. The method of claim 1, further comprising:
   determining a respective risk profile for each of the plurality of computing devices; and
   selecting, based on the respective risk profile for each computing device, the first computing devices from the plurality of computing devices for deployment of the new policy in the first stage.

6. The method of claim 1, wherein the new policy is a passive policy that includes at least one action to be performed on a computing device in the event of a policy violation, and wherein determining the respective actual compliance for each of the first computing devices comprises monitoring actual compliance of the respective first computing device with the passive policy, the method further comprising:
   receiving a report from the first computing devices, the report comprising an indication of those first computing devices that exhibit the policy violation; and
   based on the report, deploying an active policy to the first computing devices, wherein the active policy corresponds to the passive policy, and wherein the at least one action is performed on the first computing devices that exhibit the policy violation.

7. A method comprising:
   generating a new policy for deployment to a plurality of computing devices in stages;
   determining an expected compliance from deployment of the new policy;
   deploying the new policy to first computing devices in a first stage;
   receiving, by a server, first data associated with the first computing devices;
   comparing, by the server, the first data to second data stored in a data repository, wherein the second data corresponds to risks identified based on information collected from second computing devices prior to receiving the first data;
   determining, based on comparing the first data to the second data, a respective actual compliance for each of the first computing devices;
   comparing, for each of the first computing devices, the respective actual compliance to the expected compliance; and
   based on comparing the respective actual compliance to the expected compliance, rolling back deployment for the first computing devices from the first stage to a prior stage.

8. The method of claim 7, further comprising at least one of generating a report regarding prioritized deployment of a client application to the first computing devices, or performing a remediation action for at least one of the first computing devices.

9. The method of claim 7, further comprising:
generating a report regarding prioritized deployment of a client application to the first computing devices.

10. The method of claim 7, further comprising receiving the first data from an administrator server, wherein the administrator server manages policy on the first computing devices, and has collected the first data from the first computing devices.

11. The method of claim 10, wherein the administrator server deploys a client application to each of the first computing devices.

12. The method of claim 7, further comprising:
causing deployment of software to the first computing devices, wherein the software is deployed to each first computing device in a priority order based on a risk profile for the respective first computing device; and
causing presentation, in a user interface, of the priority order;
wherein deployment of the software in the priority order can be initiated by a user input in the user interface.

13. The method of claim 12, further comprising:
tracking deployment of the software to the first computing devices;
after deployment of the software to the first computing devices, performing a risk assessment for each of the first computing devices;
comparing the risk profile to the risk assessment for each of the first computing devices to provide a comparison result for each first computing device; and
causing presentation, in the user interface, of the comparison result for each first computing device.

14. The method of claim 7, further comprising:
determining a respective risk profile for each of the first computing devices; and
causing a label to be added, by an administrator server, to those of the first computing devices needing remediation based on the respective risk profile, wherein adding the label causes a remediation action to be performed by the administrator server for the labeled computing device.

15. The method of claim 7, wherein the server is a first server, and an administrator server manages policy on the first computing devices, the method further comprising:
receiving the first data from the administrator server; and
sending, by the first server, a communication causing the administrator server to implement the new policy on the first computing devices.

16. A system comprising:
at least one processor; and
memory storing instructions configured to instruct the at least one processor to:
generate a new policy for deployment to a plurality of computing devices in stages;
determine an expected compliance from deployment of the new policy;
deploy the new policy to first computing devices in a first stage;
receive first data associated with the first computing devices;
compare the first data to second data stored in a data repository, wherein the second data corresponds to information collected from second computing devices;
determine, based on comparing the first data to the second data, a respective actual compliance for each of the first computing devices;
compare, for each of the first computing devices, the respective actual compliance to the expected compliance; and
based on comparing the respective actual compliance to the expected compliance, roll back deployment for the first computing devices from the first stage to a prior stage.

17. The system of claim 16, wherein the instructions are further configured to instruct the at least one processor to:
generate policy options for deployment of the new policy to the first computing devices; and
cause presentation, in a user interface, of the policy options, wherein each policy option includes risk levels and corresponding actions to be performed on the first computing devices in response to a violation of the new policy;
wherein the new policy is determined based on a user selection from the policy options.

18. The system of claim 16, wherein the instructions are further configured to instruct the at least one processor to:
compare the new policy to the first data, wherein the first data includes information associated with at least one of device configuration, device state, or device behavior for each of the first computing devices; and
report the respective actual compliance for each of the first computing devices to an administrator server that manages policy for the first computing devices.

19. A non-transitory computer-readable storage medium storing computer-readable instructions, which when executed, cause a computing device at least to:
determine a new policy for deployment to a plurality of computing devices in stages;
determine an expected compliance from deployment of the new policy;
deploy the new policy to first computing devices in a first stage;
compare the new policy to collected data for the first computing devices, the collected data including information associated with at least one of device configuration, device state, or device behavior for each of the first computing devices;
determine, based on comparing the new policy to the collected data, a respective actual compliance for each of the first computing devices associated with implementation of the new policy;
compare, for each of the first computing devices, the respective actual compliance to the expected compliance; and
based on comparing the respective actual compliance to the expected compliance, roll back deployment for the first computing devices from the first stage to a prior stage.

20. The non-transitory computer-readable storage medium of claim 19, wherein the instructions further cause the computing device to perform at least one of transmitting a message to at least one of the first computing devices, or transmitting a message to an administrator server that manages policy for the first computing devices.

21. The non-transitory computer-readable storage medium of claim 19, wherein the instructions further cause the computing device to generate a report comprising information for each of the first computing devices indicating whether the respective first computing device complies with the new policy.

22. The method of claim 1, further comprising:
generating, based on determining the respective actual compliance for each of the first computing devices, a respective risk profile for each first computing device; and
causing deployment of a client application for installation on each of the first computing devices, wherein the client application is deployed to each first computing device in a priority order based on the generated risk profile for the respective first computing device.

23. The method of claim 7, further comprising:
generating, by the server and based on comparing the first data to the second data, a risk profile for each of the first computing devices; and
causing, by the server, deployment of a client application to the first computing devices, wherein the client application is deployed to each first computing device in a priority order based on the generated risk profile for the respective first computing device.

24. The method of claim 7, wherein the new policy is a passive policy, the method further comprising:
determining each of the first computing devices that exhibits a policy violation; and
deploying an active policy to the first computing devices, wherein the active policy corresponds to the passive policy, and wherein at least one action is performed on those of the first computing devices that exhibit the policy violation.

25. The system of claim 16, wherein the instructions are further configured to instruct the at least one processor to:
generate, based on comparing the first data to the second data, a risk profile for each of the first computing devices; and
cause deployment of a client application for installation on the first computing devices, wherein the client application is deployed to each first computing device in a priority order based on the generated risk profile for the respective first computing device.

26. The non-transitory computer-readable storage medium of claim 19, wherein the instructions further cause the computing device to:
generate, based on determining the respective actual compliance for each of the first computing devices, a respective risk profile for each first computing device; and
cause deployment of software to each of the first computing devices, wherein the software is deployed to each first computing device in a priority order based on the generated respective risk profile.

* * * * *